United States Patent
Park et al.

(10) Patent No.: US 12,236,949 B2
(45) Date of Patent: Feb. 25, 2025

(54) ELECTRONIC DEVICE AND CONTROL METHOD THEREOF

(71) Applicant: SAMSUNG ELECTRONICS CO., LTD., Suwon-si (KR)

(72) Inventors: Kyoungchoon Park, Suwon-si (KR); Keehwan Ka, Suwon-si (KR); Jongyoub Ryu, Suwon-si (KR); Minjin Song, Suwon-si (KR); Jeongwon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 272 days.

(21) Appl. No.: 17/854,450

(22) Filed: Jun. 30, 2022

(65) Prior Publication Data

US 2023/0095334 A1 Mar. 30, 2023

Related U.S. Application Data

(63) Continuation of application No. PCT/KR2022/008266, filed on Jun. 13, 2022.

(30) Foreign Application Priority Data

Sep. 24, 2021 (KR) .................. 10-2021-0126592

(51) Int. Cl.
*G10L 15/08* (2006.01)
*G10L 15/16* (2006.01)
(Continued)

(52) U.S. Cl.
CPC ............. *G10L 15/22* (2013.01); *G10L 15/08* (2013.01); *G10L 15/16* (2013.01); *G10L 25/60* (2013.01);
(Continued)

(58) Field of Classification Search
None
See application file for complete search history.

(56) References Cited

U.S. PATENT DOCUMENTS 8,340,975 B1 * 12/2012 Rosenberger ........... G10L 15/22
704/274
9,818,407 B1 * 11/2017 Secker-Walker ....... G10L 25/78
(Continued)

FOREIGN PATENT DOCUMENTS

KR 10-2018-0083587 7/2018
KR 10-2019-0090424 A 8/2019
(Continued)

OTHER PUBLICATIONS

International Search Report dated Sep. 26, 2022 in International Patent Application No. PCT/KR2022/008266 (3 pages; 3 pages English translation).
(Continued)

*Primary Examiner* — Richard Z Zhu
(74) *Attorney, Agent, or Firm* — STAAS & HALSEY LLP

(57) ABSTRACT

An electronic device including a memory storing signal information corresponding to a trigger speech; a microphone; a communication interface; and a processor configured to identify whether a first speech signal received through the microphone corresponds to the trigger speech, obtain a first speech sharpness value of the first speech signal, obtain a second speech sharpness value from the at least one external device through the communication interface, based on the first speech sharpness value being greater than the second speech sharpness value, identify a speech command included in the second speech signal received through the microphone by entering a speech recognition mode, and control the electronic device based on the identifying of the speech command. Based on the speech com-
(Continued)

mand being unidentified, the processor controls the communication interface to transmit a control signal to the at least one external device based on the second speech sharpness value.

20 Claims, 13 Drawing Sheets

(51) Int. Cl.
*G10L 15/22* (2006.01)
*G10L 25/60* (2013.01)
G10L 25/78 (2013.01)
G10L 25/84 (2013.01)
G10L 25/93 (2013.01)

(52) U.S. Cl.
CPC .. *G10L 2015/088* (2013.01); *G10L 2015/223* (2013.01); *G10L 25/78* (2013.01); *G10L 25/84* (2013.01); *G10L 25/93* (2013.01); *G10L 2025/937* (2013.01)

(56) References Cited

U.S. PATENT DOCUMENTS

| | | | |
|---|---|---|---|
| 9,875,081 | B2 | 1/2018 | Meyers et al. |
| 10,026,399 | B2 | 7/2018 | Gopalan et al. |
| 10,069,976 | B1* | 9/2018 | Gunther ............. H04M 3/5237 |
| 10,147,425 | B2* | 12/2018 | Yang ..................... G06F 3/167 |
| 11,031,008 | B2 | 6/2021 | Kim |
| 11,069,355 | B2 | 7/2021 | Lee |
| 11,189,268 | B2 | 11/2021 | Park et al. |
| 11,393,465 | B2 | 7/2022 | Lee et al. |
| 11,636,867 | B2 | 4/2023 | Woo et al. |
| 11,651,771 | B2 | 5/2023 | Lee |
| 11,721,334 | B2 | 8/2023 | Chae et al. |
| 2011/0074796 | A1 | 3/2011 | Choi et al. |
| 2014/0006825 | A1* | 1/2014 | Shenhav ............... G06F 1/3206 713/323 |
| 2014/0214429 | A1* | 7/2014 | Pantel ..................... G10L 15/22 704/275 |
| 2017/0025124 | A1* | 1/2017 | Mixter ..................... G10L 15/22 |
| 2018/0233142 | A1* | 8/2018 | Koishida ................. G06F 40/35 |
| 2019/0311713 | A1* | 10/2019 | Talwar ..................... G06F 40/30 |
| 2019/0355365 | A1 | 11/2019 | Kim et al. |
| 2019/0385630 | A1* | 12/2019 | Sivaraman ............. G10L 21/02 |
| 2020/0035235 | A1 | 1/2020 | Lee |
| 2020/0168223 | A1* | 5/2020 | Choi ..................... G10L 15/065 |
| 2020/0273451 | A1* | 8/2020 | Kim ........................ G10L 25/60 |
| 2020/0342869 | A1 | 10/2020 | Lee et al. |
| 2020/0349947 | A1 | 11/2020 | Kim et al. |
| 2020/0395014 | A1 | 12/2020 | Song et al. |
| 2021/0110837 | A1 | 4/2021 | Woo et al. |
| 2021/0241771 | A1 | 8/2021 | Yun |
| 2021/0304763 | A1 | 9/2021 | Lee |
| 2021/0366472 | A1 | 11/2021 | Lee et al. |

FOREIGN PATENT DOCUMENTS

| | | |
|---|---|---|
| KR | 10-2025566 | 9/2019 |
| KR | 10-2020-0074680 A | 6/2020 |
| KR | 10-2020-0122981 | 10/2020 |
| KR | 10-2228549 B1 | 3/2021 |
| KR | 10-2021-0044509 | 4/2021 |
| KR | 10-2021-0069977 | 6/2021 |
| KR | 10-2021-0098250 | 8/2021 |

OTHER PUBLICATIONS

Written Opinion dated Sep. 26, 2022 in International Patent Application No. PCT/KR2022/008266 (4 pages).
Extended European Search Report issued Sep. 26, 2024 for European Patent Application No. 22873065.1.

* cited by examiner

ELECTRONIC DEVICE AND CONTROL METHOD THEREOF

CROSS REFERENCE TO THE RELATED APPLICATION

This application is a continuation application, under 35 U.S.C. § 111(a), of International Application No. PCT/KR2022/008266, filed Jun. 13, 2022, which claims priority to Korean Patent Application No. 10-2021-0126592 filed on Sep. 24, 2021, the entire disclosures of which are herein incorporated by reference as a part of this application.

BACKGROUND

1. Field

This disclosure relates to an electronic device and a control method thereof and, more particularly, to an electronic device that receives a speech signal and a control method thereof.

2. Description of the Related Art

Recently, a lot of electronic devices are equipped with a speech recognition function. A user may utter a designated trigger word to execute a speech recognition function easily.

When it is determined that a user utters a trigger word, the electronic device may activate a speech recognition mode to recognize the intent included in the speech command of the user and perform the corresponding operation.

If a plurality of home appliances having the same trigger word are provided in a house, when a user intends to control a specific home appliance among a plurality of home appliances by a speech and utters a trigger word, a problem frequently occurs that a speech recognition mode of a home appliance (e.g., a home appliance closest to a user) not matching the intent of a user may be activated, or a specific home appliance may not recognize a trigger word due to ambient noise, or the like.

Accordingly, there is an inconvenience that the speech recognition mode is activated when the user reutters the trigger word after the user has moved close to a specific home appliance corresponding to the intent of the user.

Therefore, there is a need for a method and technology for smoothly activating a speech recognition mode of a particular home appliance to be controlled by a user using a speech among a plurality of home appliances without additional operations without an additional action like moving of the user, reutterance of the trigger word, or the like.

SUMMARY

An electronic device according to an embodiment may include a memory to store signal information corresponding to a trigger speech; a microphone; a communication interface; and a processor configured to identify whether a first speech signal received through the microphone corresponds to the trigger speech based on the signal information, obtain a first speech sharpness value of the first speech signal based on a result of the identifying, obtain a second speech sharpness value from the at least one external device through the communication interface, based on the first speech sharpness value being greater than the second speech sharpness value, identify a speech command included in the second speech signal received through the microphone by entering a speech recognition mode, and control the electronic device based on the identifying of the speech command, and the processor is further configured to, based on the speech command being unidentified, control the communication interface to transmit a control signal to the at least one external device based on the second speech sharpness value.

The processor may obtain a second speech sharpness value corresponding to each of a plurality of external devices including the at least one external device through the communication interface, based on the speech command being unidentified, control the communication interface to transmit the control signal to an external device corresponding to a greatest value among a plurality of second speech sharpness values, and the control signal may include at least one of a signal to control the external device to enter a speech recognition mode, the second speech signal, or a text corresponding to the second speech signal.

The processor may, based on a signal indicating that the external device receiving the control signal fails to identify the speech command included in the second speech signal through the communication interface, sequentially transmit the control signal to a remaining external device among the plurality of external devices based on the plurality of second speech sharpness values.

The memory may store identification information corresponding to the at least one external device and a first neural network model, and the processor may, based on the speech command being unidentified, identify a first external device enabled to identify the speech command among the at least one external device by inputting the second speech signal to the first neural network model, and control the communication interface to transmit the control signal to the identified first external device.

The processor may, based on a plurality of external devices being enabled to identify the speech command among the at least one external device, transmit the control signal to the first external device corresponding to a greatest value among the second speech sharpness values corresponding to each of the plurality of identified external devices, and based on an external device being enabled to identify the speech command unidentified among the at least one external device, output feedback information indicative of error occurrence.

The memory may store identification information corresponding to the at least one external device and a second neural network model, and the processor may, based on the speech command being unidentified, identify a function corresponding to a speech command included in the second speech signal and a first external device enabled to perform the function by inputting the second speech signal to the second neural network model, control the communication interface to transmit the control signal to the identified first external device, and the control signal may be a signal to control the first external device to perform a function corresponding to the speech command.

The processor may, based on receiving a third speech signal through the microphone after the control signal is transmitted to the at least one external device, transmit at least one of the third speech signal or a text corresponding to the third speech signal to the external device.

The processor may control the communication interface to transmit the first speech sharpness value to the external device, wherein the electronic device does not enter the speech recognition mode based on the first speech sharpness value being less than the second speech sharpness value.

The processor may, based on receiving a control signal from the at least one external device through the communication interface, enter the speech recognition mode or perform a function corresponding to a speech signal included in the control signal based on the control signal.

The trigger speech corresponding to the electronic device and the trigger speech corresponding to the at least one external device may be identical.

According to an embodiment, a method of controlling an electronic device includes receiving a first speech signal; identifying whether the first speech signal corresponds to the trigger speech based on signal information corresponding to the trigger speech; obtaining a first speech sharpness value of the first speech signal based on a result of the identifying; obtaining a second speech sharpness value from the at least one external device; receiving a second speech signal; based on the first speech sharpness value being greater than the second speech sharpness value, identifying a speech command included in the second speech signal by entering a speech recognition mode; and controlling the electronic device based on a result of the identifying of the speech command, and the controlling the electronic device may include, based on the speech command being unidentified, transmitting a control signal to the at least one external device based on the second speech sharpness value.

The obtaining the second sharpness value may include obtaining a second speech sharpness value corresponding to each of a plurality of external devices, the controlling the electronic device may include, based on the speech command being unidentified, transmitting the control signal to an external device corresponding to a greatest value among the plurality of second speech sharpness values, and the control signal may include at least one of a signal to control the external device to enter a speech recognition mode, the second speech signal, or a text corresponding to the second speech signal.

The controlling the electronic device may include, based on a signal indicating that the external device receiving the control signal fails to identify the speech command included in the second speech signal, sequentially transmitting the control signal to a remaining external device based on the plurality of second speech sharpness values.

The controlling the electronic device may include, based on the speech command being unidentified, identifying a first external device enabled to identify the speech command among the at least one external device by inputting the second speech signal to the first neural network model; and transmitting the control signal to the identified first external device.

The controlling the electronic device may include, based on a plurality of external devices being enabled to identify the speech command being identified among the at least one external device, transmitting the control signal to the first external device corresponding to a greatest value among the second speech sharpness values corresponding to each of the plurality of identified external devices; and based on an external device being enabled to identify the speech command being unidentified among the at least one external device, outputting feedback information indicative of error occurrence.

The controlling the electronic device may include, based on the speech command being unidentified, identifying a function corresponding to a speech command included in the second speech signal and a first external device enabled to perform the function by inputting the second speech signal to the second neural network model, and transmitting the control signal to the identified first external device, and the control signal may be a signal to control the first external device to perform a function corresponding to the speech command.

The method may include, based on receiving a third speech signal through the microphone after the control signal is transmitted to the at least one external device, transmitting at least one of the third speech signal or a text corresponding to the third speech signal to the external device.

The method may further include transmitting the first speech sharpness value to the external device, and the identifying the speech command may include, based on the first speech sharpness value being less than the second speech sharpness value, not entering the speech recognition mode.

The method may further include, based on receiving a control signal from the at least one external device through the communication interface, entering the speech recognition mode or performing a function corresponding to a speech signal included in the control signal based on the control signal.

The trigger speech corresponding to the electronic device and the trigger speech corresponding to the at least one external device may be identical.

BRIEF DESCRIPTION OF DRAWINGS

The above and/or other aspects of the disclosure will be more apparent by describing certain embodiments of the disclosure with reference to the accompanying drawings, in which.

DETAILED DESCRIPTION

Figure 1:
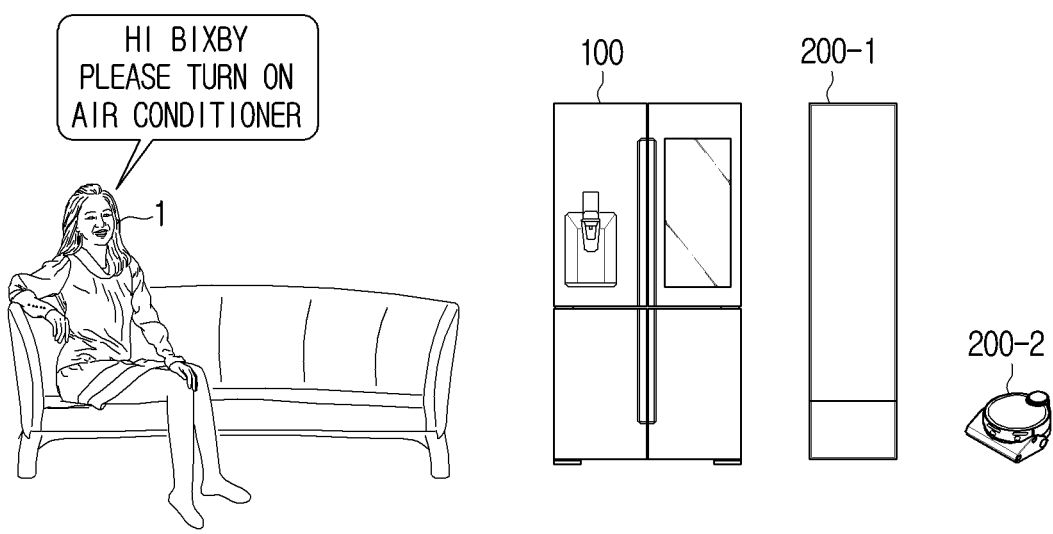
FIG. 1 is a diagram illustrating a plurality of electronic devices provided in house according to an embodiment of the disclosure.

The disclosure will be described in greater detail with reference to the attached drawings.

The terms used in the disclosure and the claims are general terms identified in consideration of the functions of embodiments of the disclosure. However, these terms may vary depending on intent, legal or technical interpretation, emergence of new technologies, and the like of those skilled in the related art. In addition, in some cases, a term may be arbitrarily selected, in which case the term will be described in detail in the description of the corresponding disclosure. Thus, the term used in this disclosure should be defined based on the meaning of term, not a simple name of the term, and the contents throughout this disclosure.

Expressions such as "have," "may have," "include," "may include" or the like represent presence of corresponding numbers, functions, operations, or parts, and do not exclude the presence of additional features.

Expressions such as "at least one of A or B" and "at least one of A and B" should be understood to represent "A," "B" or "A and B."

As used herein, terms such as "first," and "second," may identify corresponding components, regardless of order and/or importance, and are used to distinguish a component from another without limiting the components.

In addition, a description that one element (e.g., a first element) is operatively or communicatively coupled with/to" or "connected to" another element (e.g., a second element) should be interpreted to include both the first element being directly coupled to the second element, and the first element being indirectly coupled to the second element through an intervening third element.

A singular expression includes a plural expression, unless otherwise specified. It is to be understood that terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as "module," "unit," and "part," is used to refer to an element that performs at least one function or operation and that may be implemented as hardware or software, or a combination of hardware and software. Except when each of a plurality of "modules," "units," "parts," and the like must be realized in an individual hardware, the components may be integrated in at least one module or chip and be realized in at least one processor.

In the following description, a "user" may refer to a person using an electronic device or an artificial intelligence electronic device using an electronic device (e.g., artificial intelligence electronic device).

It is an object of the disclosure to provide an electronic device for activating a speech recognition mode of an electronic device to be controlled by a user using a speech among a plurality of electronic devices, and a control method thereof.

As described above, according to various embodiments of the disclosure, a speech recognition mode of a specific electronic device to be controlled by a user among a plurality of electronic devices may be activated without additional operations (e.g., moving of a user or reutterance of a trigger speech) of a user.

Hereinafter, various example embodiments of the disclosure will be described in greater detail.

FIG. 1 is a diagram illustrating a plurality of electronic devices provided in house according to an embodiment of the disclosure.

Referring to FIG. 1, as various types of home appliances have been developed and distributed, a plurality of electronic devices may be provided in a house.

Each of the plurality of electronic devices may be controlled according to the utterance speech of a user 1. For example, the electronic device 100 may include a microphone (not shown) and may receive a speech signal according to the utterance of the user 1 through the microphone. As another example, the electronic device 100 may receive a speech signal from a remote control device (not shown) provided with a microphone.

The electronic device 100 may then identify whether the received speech signal corresponds to a trigger speech. For example, the electronic device 100 may include a memory (not shown) in which signal information corresponding to the trigger speech is stored, and may identify whether the received speech signal corresponds to a trigger speech based on the signal information. The electronic device 100 may then enter a speech recognition mode if the received speech signal includes a trigger speech.

The speech recognition mode may be a mode in which a speech command included in the speech signal is identified according to the utterance of the user 1 by the electronic device 100 and performs a function corresponding to the speech command.

The trigger speech may also be a word of a predetermined one syllable or more length that activates the speech recognition mode of the electronic device 100. According to an embodiment, the trigger speech may be referred to as a trigger word, a wakeup word, or the like. Hereinafter, the term will be called a trigger speech for convenience of description. The trigger speech may be pre-set in the manufacturing step of the electronic device 100, and may be added or deleted according to the user's setting. As another example, the trigger speech may be changed, added, etc. through firmware update or the like.

Referring to FIG. 1, a case where the electronic device 100 receives a speech signal (e.g., a "Hi, Bixby") is received. The electronic device 100 may activate the speech recognition mode if the received speech signal corresponds to a "Hi, Bixby" which is a trigger sound. The activation of the speech recognition mode may mean entering a mode (e.g., a state in which components in the electronic device 100 associated with speech recognition switches from a standby mode to a normal mode, a state in which power is supplied to the components associated with speech recognition, or the like) that recognizes a speech command included in a speech signal according to the utterance of the user 1. According to an example, the electronic device 100 may be switched from a general mode to a speech recognition mode. As another example, the electronic device 100 may not activate the speech recognition mode if the received speech signal does not correspond to the trigger speech.

As illustrated in FIG. 1, a plurality of electronic devices may be provided in a space (e.g., in-house), and a trigger speech corresponding to each of the plurality of electronic devices may be equal to each other. Even when the user 1 wishes to activate a speech recognition mode of a specific electronic device among a plurality of electronic devices by uttering a trigger speech, a speech recognition mode of another electronic device, which is not a specific electronic device according to the intent of a user, may be activated or a speech recognition mode of the plurality of electronic devices may be activated.

As an example, when the user 1 utters a trigger speech, the speech recognition model is activated with only the electronic device 100 (e.g., the electronic device 100 located at a relatively short distance from the user 1) that receives the speech signal according to the utterance of the user 1 among the plurality of electronic devices, and a speech recognition mode may not be activated with other electronic devices (e.g., a first external device 200-1 and a second external device 200-2 which are located at a relatively farther distance from the user 1) located at a relatively long distance from the other electronic device.

As shown in FIG. 1, even if the electronic device 100 in which the speech recognition mode is activated receives a second speech signal (e.g., "please turn on air conditioner) subsequent to the first speech signal of the user 1, that is, the trigger speech (for example, "Hi, Bixby"), the electronic device 100 may not perform a function corresponding to the second speech signal, and an external device according to the intent of the user 1, that is, a first external device 200-1 (e.g., the air conditioner) is not activated with the speech recognition mode, so the first external device 200-1 may not identify the speech command (e.g., turn on) included in the second speech signal.

Hereinafter, various embodiments in which the electronic device 100 receives a speech signal corresponding to a trigger speech and activates a speech recognition mode of a specific electronic device according to the intent of the user 1 among the plurality of electronic devices, or transmits a control signal to a specific electronic device will be described.

Figure 2:
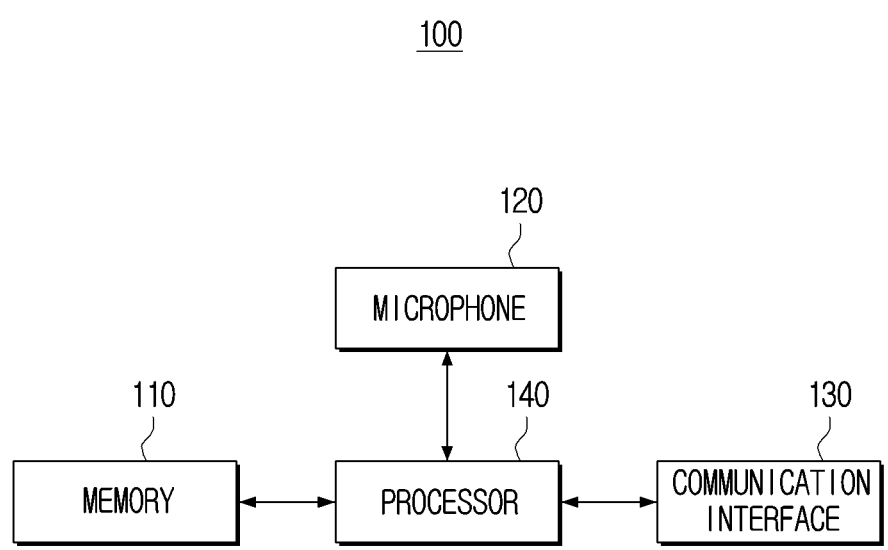
FIG. 2 is a block diagram illustrating a configuration of an electronic device according to an embodiment of the disclosure.

FIG. 2 is a block diagram illustrating a configuration of an electronic device according to an embodiment of the disclosure.

Referring to FIG. 2, the electronic device 100 includes a memory 110, a microphone 120, a communication interface 130, and a processor 140.

The memory 110 may store signal information corresponding to the trigger speech to enter the speech recognition mode.

The signal information corresponding to the trigger speech may include at least one of an utterance frequency of a trigger speech activating a speech recognition mode, utterance length information, or pronunciation variants information. The utterance frequency may include information on a frequency change rate, an amplitude change rate, etc. during a trigger speech utterance of a human. The utterance frequency of the trigger speech may vary depending on the structure of a human such as mouth, a vocal cord, throat, age, gender, race, etc. of a human. The signal information corresponding to the trigger speech according to an embodiment of the disclosure may include a plurality of utterance frequencies. The utterance frequency may be referred to as a vocalization frequency or the like, but will hereinafter be referred to as an utterance frequency for convenience of description.

The utterance length information of the trigger speech may include an average utterance length, a lower utterance length, an upper utterance length, and the like, during the trigger speech utterance of the human.

The pronunciation variants information of the trigger speech may be indicative of a pronunciation of a human's trigger speech utterance. For example, since the trigger speech "Hi Bixby" may be variously pronounced depending on humans, the pronunciation variants information may include a plurality of pronunciation variants.

The microphone 120 may refer, for example, to an element to receive a user speech or other sound and convert the received sound to audio data.

The microphone 120 may receive the user speech in an active state. For example, the microphone 120 may be integrally formed as an integral unit on an upper side, a front side direction, a side direction, or the like of the electronic device 100. The microphone 120 may include various configurations such as a microphone for collecting user speech in an analog format, an amplifier circuit for amplifying the collected user speech, an audio-to-digital (A/D) conversion circuit for sampling the amplified user speech to convert into a digital signal, a filter circuitry for removing a noise element from the converted digital signal, or the like. According to an embodiment, the microphone 120 may obtain an audio signal according to utterance of a user 1 and provide the signal to the processor 140.

The electronic device 100 according to another embodiment of the disclosure may include various types of input units in addition to the microphone 120. For example, the input unit may include a keyboard, a mouse, a key pad, a touch pad, a camera, and the like, but is not limited thereto. The electronic device 100 may receive a user command, a control command, and the like through various types of input units.

The communication interface 130 may receive various types of data. For example, the communication interface 130 may receive various types of data with an eternal device 200 provided in a household, external storage medium (e.g., USB memory), external server (e.g., web hard) through communication methods such as an access point (AP)-based wireless fidelity (Wi-Fi) (wireless local area network (WLAN)), Bluetooth, Zigbee, wired/wireless local area network (LAN), wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, or the like.

The communication interface 130 according to an embodiment of the disclosure may transmit a speech sharpness value corresponding to a trigger speech uttered by a user to at least one external device 200 under the control of the processor 140, and may receive a speech sharpness value obtained by the at least one external device 200. The detailed description will be described later.

The processor 140 according to an embodiment controls overall operations of the electronic device 100.

The processor 140 according to an embodiment may be implemented with, for example, and without limitation, a digital signal processor (DSP) for image-processing of a digital image signal, a microprocessor, a graphics processor (GPU), an AI (AI) processor, a neural processor (NPU), a time controller (TCON), or the like, but this is not limited thereto. The processor 140 may include, for example, and without limitation, one or more among a central processor (CPU), a micro controller unit (MCU), a micro processor (MPU), a controller, an application processor (AP), a communication processor (CP), an advanced reduced instruction set computing (RISC) machine (ARM) processor, a dedicated processor, or may be defined as a corresponding term. The processor 140 may be implemented in a system on chip (SoC) type or a large scale integration (LSI) type which a processing algorithm is built therein, application specific integrated circuit (ASIC), or in a field programmable gate array (FPGA) type.

The processor 140 may identify whether the speech signal received via the microphone 120 corresponds to a trigger speech based on the signal information stored in the memory 110. For example, the processor 140 may analyze the speech signal to obtain characteristic information. The characteristic information may include at least one of an utterance frequency, utterance length information, or pronunciation variants information.

The processor 140 may then analyze the speech signal to identify whether the speech signal corresponds to the trigger speech based on similarity between the characteristic information obtained by analyzing the speech signal and the signal information stored in the memory 110. For example, the processor 140 may obtain a similarity value having a value of 0 to 1, and if the similarity value is greater than or equal to a threshold value (e.g., 0.7), identify that the speech signal received via the microphone 120 corresponds to a trigger speech. A range and threshold values of the similarity values are exemplary and are not limited thereto. As another example, the signal information may include texts corresponding to the trigger speech. The processor 140 may analyze the speech signal to obtain a text, compare the text with the signal information stored in the memory 110 to obtain a similarity value, and identify whether the speech signal corresponds to a trigger speech.

The embodiment is not limited thereto and the processor 140 may identify whether a speech signal corresponds to the trigger speech, that is, whether the user 1 utters a trigger speech, by using various methods of the related art.

The processor 140 may obtain the speech sharpness value of the speech signal when the speech signal corresponds to the trigger speech (e.g., if the similarity value is greater than or equal to a threshold value).

When the processor 140 identifies that the speech signal according to the utterance of the user 1 corresponds to the trigger speech, the processor 140 may obtain a speech sharpness value of the corresponding speech signal. Hereinafter, for convenience of description, a speech signal corresponding to a trigger speech is referred to as a first speech signal.

The processor 140 may analyze the first speech signal to obtain a speech sharpness value. For example, the processor 140 may obtain a speech sharpness value based on the magnitude of the first speech signal received through the microphone 120. For example, the processor 140 may obtain a speech sharpness value based on a sound pressure level (SPL) corresponding to the first speech signal, a loudness value obtained by converting the first speech signal into a decibel scale, and obtain a speech sharpness value by combining various values such as sound pressure, loudness, etc.

As another example, the processor 140 may obtain a speech sharpness value using a signal to noise ratio (SNR) corresponding to the first speech signal, and in another example, the processor 140 may obtain a speech sharpness value using a similarity value (i.e., a similarity between the first speech signal and the trigger speech) corresponding to the first speech signal.

The embodiment is not limited thereto, and the processor 140 may combine the values (e.g., SPL, loudness, SNR, similarity value, dB, etc.) according to the foregoing example to obtain a speech sharpness value corresponding to the first speech signal. In addition to the above example, the processor 140 may analyze the first speech signal using various speech processing technologies and obtain a speech sharpness value corresponding to the first speech signal.

Generally, as the distance between the electronic device 100 and the user 1 becomes shorter, the speech sharpness value may increase, and as the distance increases, the speech sharpness value may be reduced, but it is not limited thereto. For example, the distance between the electronic device 100 and the user 1 may not be inversely proportional due to in-house noise (e.g., a speech noise such as cough, laughter, cry, exclamation, or non-speech noise like TV sound, a music sound, a telephone bell sound, a noise generated according to the driving of the home appliance, etc.).

The processor 140 according to an embodiment of the disclosure may control the communication interface 130 to transmit a speech sharpness value corresponding to the first speech signal to the at least one external device 200, and may receive a speech sharpness value from the at least one external device 200 through the communication interface 130.

In the following description, for convenience of description, the sound sharpness value obtained by the processor 140 using the first speech signal will be referred to as the first speech sharpness value. The speech sharpness value obtained by the at least one external device 200 using the first speech signal will be referred to as the second speech sharpness value.

Referring to FIG. 1, the speech sharpness value obtained by analyzing the first speech signal by the electronic device 100 in the viewpoint of the electronic device 100 (e.g., refrigerator) will be referred to as the first speech sharpness, and the speech sharpness value received by at least one external device 200 (e.g., air-conditioner, robot cleaner, etc.) will be referred to as the second speech sharpness.

The processor 140 according to an embodiment of the disclosure may enter a speech recognition mode if a first speech sharpness value from among the first speech sharpness value and the second speech sharpness value is the largest value. As another example, the processor 140 may not enter the speech recognition mode if the first speech sharpness value of the first speech sharpness value and the second speech sharpness value is not the largest value.

A specific description will be given with reference to FIG. 3.

Figure 3:
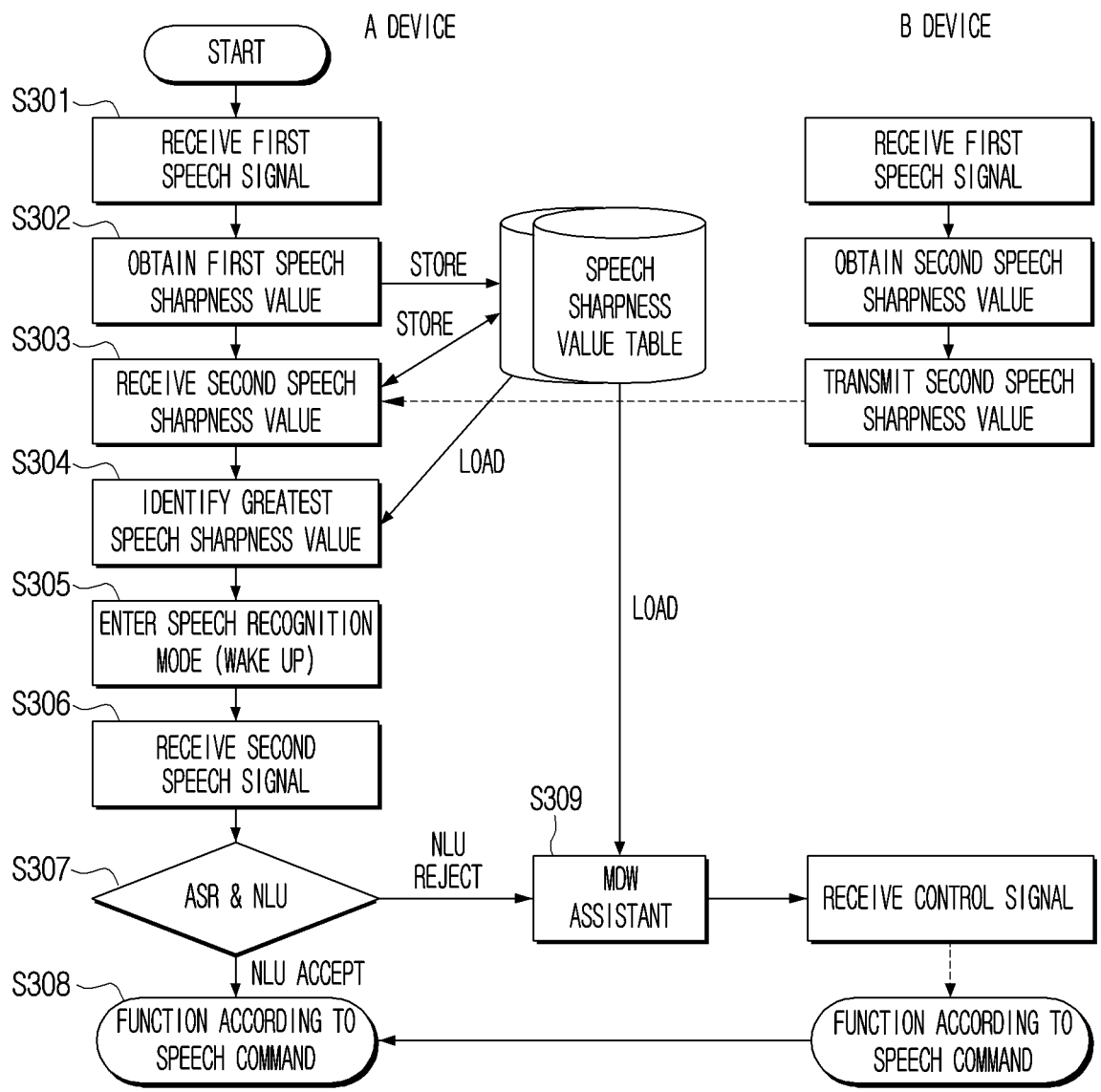
FIG. 3 is a flowchart illustrating a speech sharpness value and a speech recognition mode according to an embodiment of the disclosure.

FIG. 3 is a flowchart illustrating a speech sharpness value and a speech recognition mode according to an embodiment of the disclosure.

FIG. 3 illustrates an example in which the processor 140 obtains the first speech sharpness value of the first speech signal since the first speech signal according to the utterance of the user 1 corresponds to a trigger speech (e.g., Hi Bixby) in operations S301 and S302.

For example, the processor 130 may obtain the first speech sharpness value and store the value in a speech sharpness value table in operation S302.

The processor 140 may then receive the second speech sharpness value from the external device and store the second speech sharpness value in the speech sharpness value table in operation S303. The processor 140 may integrate (or merge) the first speech sharpness value and the second speech sharpness value to obtain a speech sharpness value table. The processor 140 may identify the speech sharpness value of the largest value based on the speech sharpness value table in operation S304. For example, the processor 140 may identify whether the first speech sharpness value is greater than the second speech sharpness value.

The table is merely an example for convenience of description, and the processor 140 may incorporate a first speech sharpness value and a second speech sharpness value in various formats and types, and may identify a speech sharpness value of the largest value among the plurality of speech sharpness values.

The processor 140 may then enter a speech recognition mode if the first speech sharpness value corresponding to the electronic device 100 is identified as the largest value among the plurality of speech sharpness values in operation S305. As shown in FIG. 3, the operation of entering the speech recognition mode by the electronic device 100 may be referred to as a wake-up operation.

According to an embodiment, the speech recognition module provided in the electronic device 100 may include an automatic speech recognition (ASR) module and a natural language understanding (NLU) module.

According to an embodiment, in the speech recognition mode, the ASR module may recognize the speech signal received through the microphone 120 and may obtain a text corresponding to the speech signal. For example, the processor 140 may receive the second speech signal in operation S306 and may input the second speech signal to the ASR module to obtain text corresponding to the second speech signal.

For convenience of description, the speech signal (e.g., "please turn on air conditioner") received through the microphone 120 subsequent (or continuously) to the first speech signal, that is, the trigger speech (e.g., "Hi Bixby") will be referred to as the second speech signal.

Subsequently, the natural language understanding (NLU) module may obtain a control command corresponding to the text obtained through the ASR module in operation S307. The natural language understanding module may analyze the text to see how the user 1 wants to control the electronic device 100 through the second speech signal, that is, may convert the intent of the user 1 (e.g., the speech signal according to the utterance of the user 1) into a control command understandable (or interpretable) by the electronic device 100.

The control command has been obtained from the second speech signal and may be called a speech command, and will be referred to as a speech command for convenience of description.

The processor 140 may control the electronic device 100 to perform a function according to a speech command obtained through the natural language understanding module (see FIG. 3, NLU accept, S308).

The natural language understanding module provided in the processor 140 may identify at least one speech command corresponding to the second speech signal among a plurality of speech commands corresponding to the electronic device 100 by analyzing the second speech signal. According to another embodiment, even if the natural language understanding module analyzes the second speech signal, the module may not identify at least one speech command corresponding to the second speech signal among the plurality of speech commands corresponding to the electronic device 100 (see FIG. 3, NLU reject). For example, if the electronic device 100 is a refrigerator and the text corresponding to the second speech signal obtained through the speech recognition module is "please increase the cleaning intensity", the natural language understanding module provided in the processor 140 of the refrigerator may not identify a speech command corresponding to "please increase the cleaning intensity" among a plurality of speech commands corresponding to the refrigerator.

If a speech command corresponding to the second speech signal is not identified (refer to FIG. 3, NLU reject), the processor 140 may control the communication interface 130 to transmit a control signal to the at least one external device 200 based on the second speech sharpness value.

Referring to FIG. 3, the processor 140 may include a multi device wakeup (MDW) assistant module. The MDW assistant module may compare the magnitudes of each of a plurality of speech sharpness values included in the speech sharpness value table, and may identify a device corresponding to each of the plurality of speech sharpness values (e.g., the electronic device 100, the first external device 200-1, the second external device 200-2, etc.).

As described above, the processor 140 may identify the largest value of the speech sharpness value by itself based on the speech sharpness value table. As another example, the processor 140 may request identification of the speech sharpness value of the largest value among the plurality of speech sharpness values and a device corresponding thereto to the MDW assistant module, and may receive a response according to the request from the MDW assistant module.

For example, the processor 140 may determine whether a wake-up operation is performed when a speech sharpness value of the largest value among the plurality of speech sharpness values is received from the MDW assistant module. For example, the processor 140 may enter a speech recognition mode if it is identified that the first speech sharpness value corresponds to the speech sharpness value of the largest value using an MDW assistant module.

The MDW assistant module is a term for convenience of description, and may be referred to as various terms, not being limited thereto. For example, the MDW assistant module may be referred to as a speech sharpness value comparison module, or the like.

If the speech command corresponding to the second speech signal is not identified (refer to FIG. 3, NLU reject), the MDW assistant module may identify the largest value among the second speech sharpness values corresponding to each of the plurality of external devices. The MDW assistant module may transmit a control signal to the external device 200 (referring to FIG. 3, B device) of the largest value among the plurality of second speech sharpness values in operation S309.

This will be further described with reference to FIG. 4.

Figure 4:
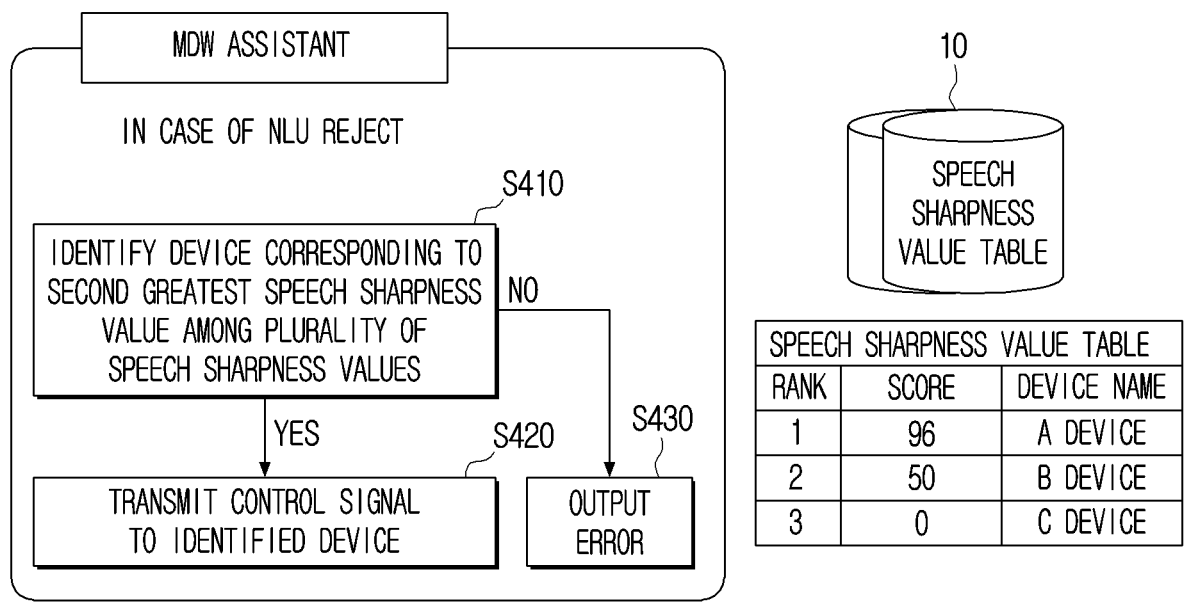
FIG. 4 is a flowchart illustrating a method of comparing a plurality of speech sharpness values according to an embodiment of the disclosure.

FIG. 4 is a flowchart illustrating a method of comparing a plurality of speech sharpness values according to an embodiment of the disclosure.

Referring to FIG. 4, the MDW assistant module may compare the magnitudes of each of the plurality of speech sharpness values included in a speech sharpness value table 10 and may identify a device (e.g., A device, B device, C device, or the like) corresponding to each of the plurality of speech sharpness values.

For example, if the MDW assistant module identifies the speech sharpness value of the largest value among the plurality of speech sharpness values (for example, the first speech sharpness value and a plurality of second speech sharpness values) as the first speech sharpness value obtained by the electronic device 100, the electronic device 100 may identify at least one speech command corresponding to the second speech signal by using the ASR module and the NLU module provided in the speech recognition module (see FIG. 3, S304 to S307).

If at least one speech command corresponding to the second speech signal is not identified, as shown in FIG. 3 (NLU reject of FIG. 3), the electronic device 100 may identify the second large value of the speech sharpness value (e.g., the largest value among the plurality of second speech sharpness values) from among the plurality of speech sharpness values using the MDW assistant module in operation S410. The MDW assistant module may then control the communication interface 130 to transmit a control signal to the external device 200 corresponding to the largest value of the plurality of second speech sharpness values in operation S420. As another example, if other speech sharpness values are not identified, in addition to the first speech sharpness value, the electronic device 100 may output a feedback, error, indicating that at least one speech command corresponding to the second speech signal is not identified in operation S430.

The control signal may be a signal that controls the external device 200 to enter a speech recognition mode. For example, the external device 200 receiving the control signal may enter a speech recognition mode, receive a speech signal according to the user's utterance, and identify a speech command corresponding to the received speech signal to perform an operation.

As another example, the control signal may include at least one of a speech signal or text corresponding to a speech signal. For example, the external device 200 may receive, from the electronic device 100, a second speech signal (e.g., "please turn on air-conditioner") received subsequently to the first speech signal corresponding to the trigger speech by the electronic device 100 or a control signal including a text corresponding to the second speech signal, and may obtain a speech command corresponding to the second speech signal or text included in the received control signal.

The external device 200 may control the external device 200 to perform a function corresponding to the speech command (same as the NLU accept of the electronic device 100).

A specific description will be given with reference to FIG. 5.

Figure 5:
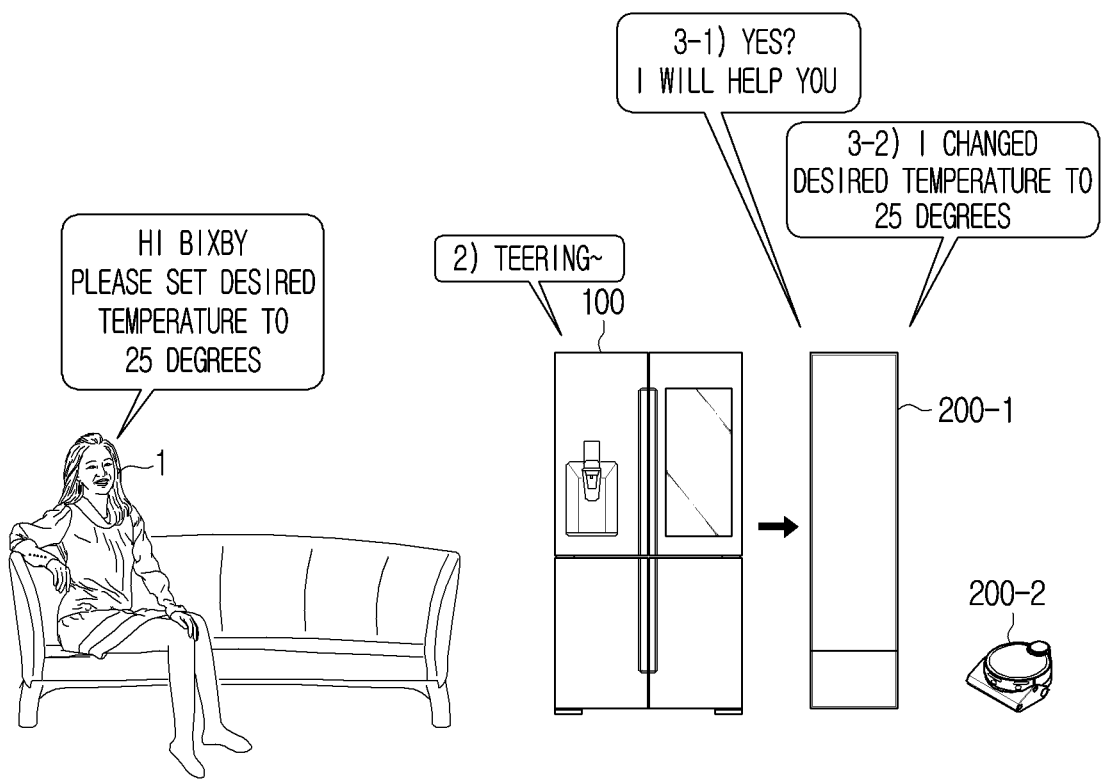
FIG. 5 is a diagram illustrating a control signal according to an embodiment of the disclosure.

FIG. 5 is a diagram illustrating a control signal according to an embodiment of the disclosure.

FIG. 5 illustrates an example in which the MDW assistant module included in the processor 140 transmits a control signal to the first external device 200-1 corresponding to the largest value among the plurality of second speech sharpness values.

Referring to FIG. 5, the electronic device 100 may output a feedback (e.g., a sound feedback such as a "tteering" (an example of a beep sound)) indicating that the first speech signal has entered the speech recognition mode because the first speech signal corresponds to a trigger speech (e.g., Hi Bixby).

The processor 140 may transmit a control signal to the first external device 200-1 corresponding to the largest value of the plurality of second speech sharpness values if at least one speech command corresponding to the second speech signal (e.g., "please set the desired temperature to 25 degrees") is not identified.

According to an embodiment, the control signal may be a signal that controls the first external device 200 to enter a speech recognition mode. For example, the first external device 200-1 receiving the control signal may enter a speech recognition mode, receive a speech signal according to the user's utterance, and identify a speech command corresponding to the received speech signal to perform an operation. As an example, as shown in 3-1) of FIG. 5, the first external device 200-1 receiving the control signal may enter the speech recognition mode in the same manner as receiving the first speech signal, and may output feedback (e.g., "Yes? May I help you?") indicates of entering the speech recognition mode. The first external device 200-1 may additionally output a feedback (e.g., sound feedback, such as "Would you say that again?") that requests reutterance of the user 1.

As another example, the control signal may include at least one of a speech signal or text corresponding to a speech signal. For example, as shown in 3-2) of FIG. 5, the first external device 200-1 may receive, from the electronic device 100, a control signal including a second speech signal (e.g., "please set the desired temperature to 25 degrees") or a text corresponding to a second speech signal received in response to a first speech signal corresponding to a trigger speech, and obtain a speech command corresponding to a second speech signal or text included in the received control signal.

The natural language understanding (NLU) module included in the external device 200 may analyze the second speech signal to identify at least one speech command corresponding to the second speech signal among the plurality of speech commands corresponding to the external device 200 (the same as the NLU accept of the electronic device 100 shown in FIG. 3). The external device 200 may then perform a function according to the identified speech command. In this example, the first external device 200-1 may omit a step of outputting feedback indicating that the first external device 200-1 has entered the speech recognition mode or feedback requesting reutterance of the user 1, and may complete the performance of the function according to the identified speech command.

According to another embodiment, the natural language understanding module included in the external device 200 may not identify at least one speech command corresponding to the second speech signal among the plurality of speech commands corresponding to the external device 200 even when the second speech signal is analyzed (the same as the NLU reject of the electronic device 100 shown in FIG. 3). For example, if the external device 200 is an air conditioner and the text corresponding to the second speech signal obtained through the speech recognition module is "please increase the cleaning intensity", the natural language understanding module provided in the air conditioner may not identify a speech command corresponding to "please increase the cleaning intensity" among a plurality of speech commands corresponding to the air conditioner.

In this example, the external device 200 may transmit a feedback signal indicating that the speech command corresponding to the control signal received at the electronic device 100 is not identified.

Figure 6:
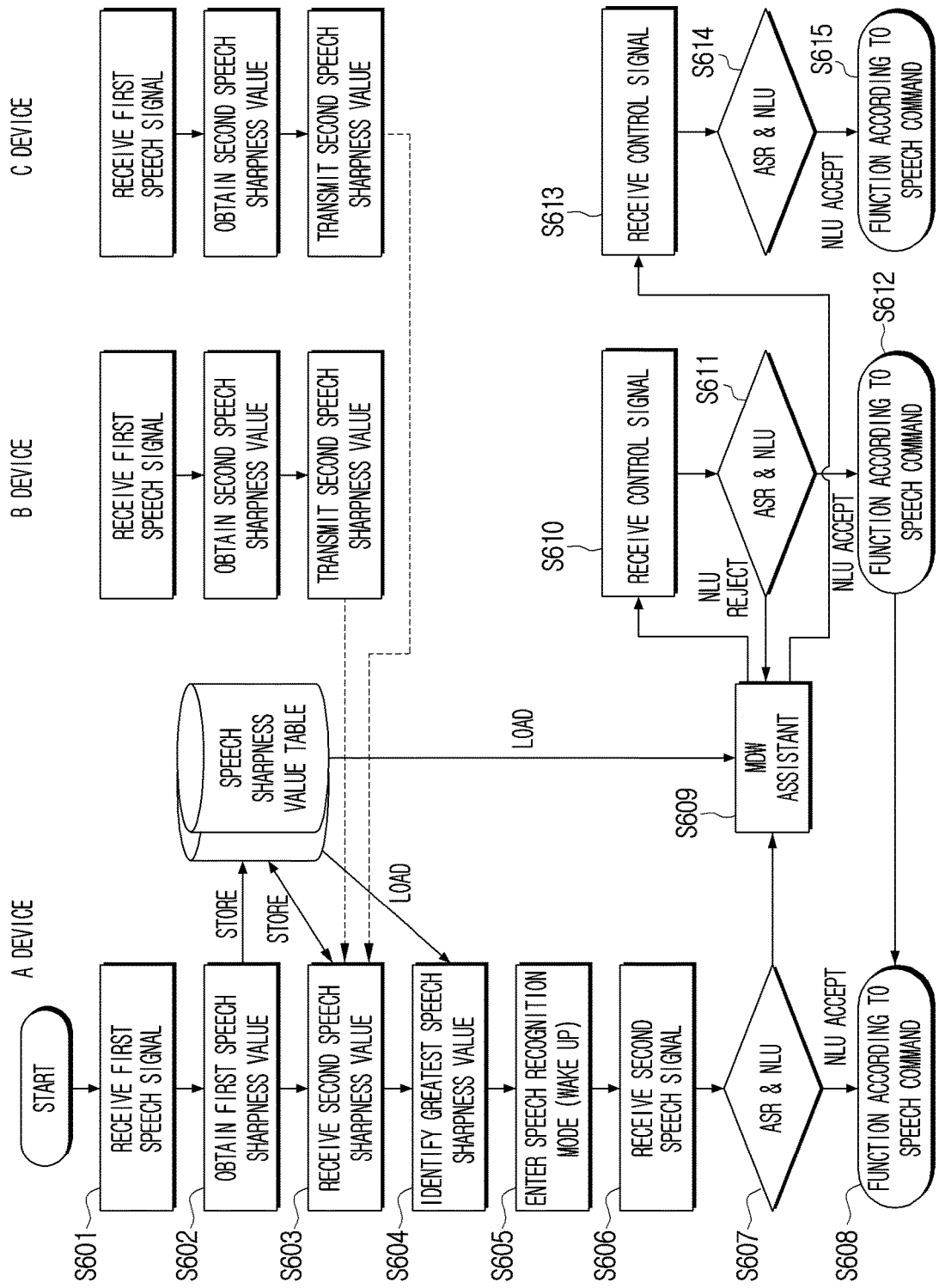
FIG. 6 is a flowchart illustrating a method of sequentially transmitting a control signal to an external device according to an embodiment of the disclosure.

FIG. 6 is a flowchart illustrating a method of sequentially transmitting a control signal to an external device according to an embodiment of the disclosure.

The operations S601 to S609 of FIG. 6 have been described in the flowchart of FIG. 3 and thus will be omitted.

The first external device 200-1 receiving the control signal may enter a speech recognition mode (or perform a wake-up operation), and may obtain a speech command corresponding to a second speech signal included in the control signal received from the electronic device 100 by using the ASR module and the NLU module in operation S611:NLU accept. The first external device 200-1 may perform a function according to a speech command in operation S612.

According to another embodiment, if the first external device 200-1 analyzes the second speech signal, when the first external device 200-1 does not identify at least one speech command corresponding to the second speech signal among the plurality of speech commands corresponding to the first external device 200-1 (S611: NLU reject), the first external device 200-1 may transmit a feedback signal indicating that a speech command corresponding to the second speech signal has not been identified by the electronic device 100.

When a feedback signal indicating that a speech command corresponding to the second speech signal has not been identified is received from the first external device 200-1, the processor 140 may transmit a control signal to the second external device 200-2 corresponding to the second large value among the plurality of second speech sharpness values, and the second external device 200-2 may receive the control signal in operation S613.

When a signal indicating that the first external device 200-1 receiving the control signal does not identify the speech command included in the second speech signal is received through the communication interface 130, the processor 140 may sequentially transmit the control signal to other external devices based on the plurality of second speech sharpness values.

The second external device 200-2 receiving the control signal may obtain a speech command corresponding to the second speech signal included in the control signal received from the electronic device 100 by using the ASR module and the NLU module (S614: NLU_accept). The second external device 200-2 may perform a function according to a speech command in operation S615.

When the second external device 200-2 analyzes the second speech signal, if the second external device 200-2 does not identify at least one speech command corresponding to the second speech signal among the plurality of speech commands corresponding to the second external device 200-2 (S614: NLU_reject), and the second external device 200-2 may transmit a feedback signal indicating that a speech command corresponding to the second speech signal has not been identified by the electronic device 100.

Figure 7:
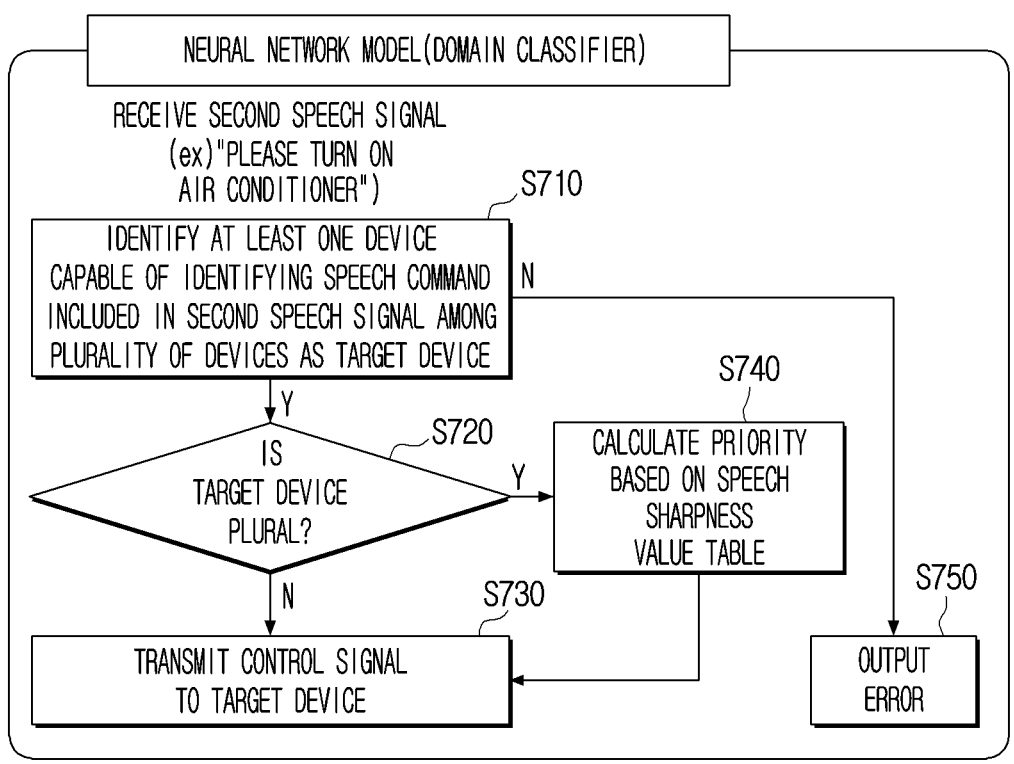
FIG. 7 is a flowchart illustrating a neural network model according to an embodiment of the disclosure.

FIG. 7 is a flowchart illustrating a neural network model according to an embodiment of the disclosure.

According to an embodiment of the disclosure, the memory 110 may store identification information and a neural network model corresponding to each of a plurality of devices (e.g., the electronic device 100, the first external device 200-, and the second external device 200-2).

The processor 140 according to an embodiment of the disclosure may input a second speech signal or a text corresponding to the second speech signal into a neural network model if the speech command included in the second speech signal is not identified.

The processor 140 may use a neural network model to identify at least one device capable of identifying a speech command included in a second speech signal of the plurality of devices as a target device in operation S710.

The neural network model may be a model trained to output identification information of a device identifiable (understandable, or capable of performing a function corresponding to the speech command) of at least one speech command corresponding to the speech signal with the identification information and a plurality of speech commands corresponding to each of a plurality of devices.

For example, the neural network model is similar to the natural language understanding module, but the neural network model may be differentiated from the natural language understanding module in that the model is not a module that converts how the user 1 is to control the electronic device 100 through the second speech signal, that is, the intent of the user 1 (e.g., the speech signal according to the utterance of the user 1) to a speech command understandable (or interpretable) by the electronic device 100, but a model that predicts which device includes a natural language understanding module capable of identifying a speech command corresponding to the second speech signal from among natural language understanding modules included in each of the plurality of devices. However, this is merely exemplary and the neural network model may be implemented as a module that analyzes the second speech signal to control one of the plurality of devices, that is, to convert the intent of the user 1 into a speech command that is understandable by the electronic device 100.

The output value of the neural network model according to an embodiment is a probability value for each of the plurality of devices, and the processor 140 may identify that the target device exists if there is at least one device (e.g., the first external device 200-1) corresponding to a probability value greater than or equal to a threshold value (e.g., 70%, etc.) of the plurality of probability values in operation S710.

The neural network model shown in FIG. 7 may be implemented as an on-device type neural network model which predicts identification possibility for speech command included in the speech signal instead of a model which considers functions of each of a plurality of devices, identifies a speech command included in the speech signal, and specifically identifies at least one device capable of performing a function according to the identified speech command.

In operation S730, the processor 140 may transmit a control signal to the identified target device, that is, the first external device 200-1, if only one external device capable of identifying the speech command included in the second speech signal among the plurality of devices is identified (e.g., when only one target device is identified) in operation S720:N.

As another example, the processor 140 may transmit a control signal to the first external device 200-1 corresponding to the largest value of the second speech sharpness values corresponding to each of the plurality of identified external devices, if a plurality of external devices capable of identifying a speech signal included in the second speech signal, among a plurality of devices, is identified (e.g., when a plurality of target devices are identified) (S720:Y). For example, the processor 140 may assign a priority of each of the plurality of external devices identified based on the speech sharpness value table 10. For example, the processor 140 may assign priorities according to the speech sharpness values of each of the plurality of external devices in operation S740.

As shown in FIG. 6, the processor 140 may sequentially transmit control signals to each of the plurality of external devices identified according to the priority. For example, if the control signal is transmitted to the first external device 200-1 assigned with the first priority, and when a feedback signal indicating that the first external device 200-1 has not identified a speech command corresponding to the second speech signal is received from the first external device 200-1, a control signal may be transmitted to the second external device 200-2 with which the second priority is assigned. If a feedback signal indicating that a speech command corresponding to the second speech signal is not identified is received from all of the plurality of identified external devices, the processor 140 may output feedback, error, indicating that at least one speech command corresponding to the second speech signal is not identified (S614: NLU reject of FIG. 6).

As another example, if the first external device 200-1 receiving the control signal from the electronic device 100 does not identify a speech command corresponding to the second speech signal, the first external device 200-1 may identify a next largest value (e.g., a speech sharpness value of the third large value) of the speech sharpness values corresponding to the first external device 200-1 among the plurality of speech sharpness values. That is, since the electronic device 100 and the plurality of external devices (e.g., the first external device 200-1 and the second external device 200-2) share a speech sharpness value or a speech sharpness value table, it is possible to identify the speech sharpness value of different devices.

The first external device 200-1 may transmit a feedback signal indicating that a speech command corresponding to the second speech signal has not been identified to the electronic device 100, but the first external device 200-1 may transmit a control signal to the second external device 200-2. For example, the first external device 200-1 may transmit a control signal to the second external device 200-2 if a value next greater than a speech sharpness value corresponding to the first external device 200-1, among a plurality of speech sharpness values, is a second speech sharpness value obtained by the second external device 200-2. The second external device 200-2 receiving the control signal may obtain a speech command corresponding to the second speech signal included in the control signal.

If the second external device 200-2 fails to obtain the speech command, the second external device 200-2 may transmit a control signal indicating that the speech command is not identifiable to the electronic device 100, but as another example, the second external device 200-2 may transmit, to a third external device corresponding to a value (e.g., a speech sharpness value of the fourth large value) next greater than the speech sharpness corresponding to the second external device 200-2 among the plurality of speech sharpness values.

Accordingly, various embodiments of the disclosure may be implemented in a form in which the electronic device 100 sequentially transmits a control signal, and in which the electronic device 100, the external device 200, and the like, may be implemented in the form of transmitting a control signal to the identified device after identifying the device corresponding to the next large value among the plurality of speech sharpness values.

As another example, if at least one external device capable of identifying a speech command is not identified among a plurality of devices in operation S710:N, the processor 140 may output an error in operation S740.

Figure 8:
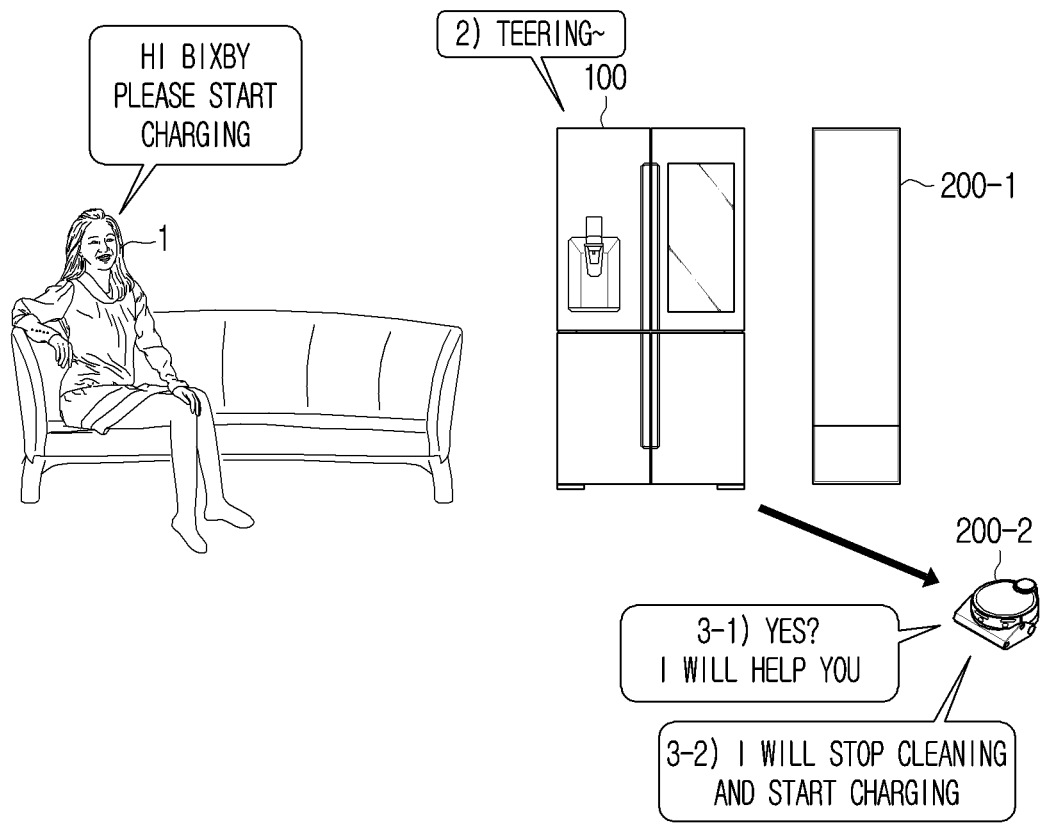
FIG. 8 is a diagram illustrating a method of transmitting a control signal to an external device according to an embodiment of the disclosure.

FIG. 8 is a diagram illustrating a method of transmitting a control signal to an external device according to an embodiment of the disclosure.

Referring to FIG. 8, the processor 140 may identify the second external device 200-2 (e.g., a robot cleaner) that may identify the speech commands included in the second speech signal of at least one external device 200 by entering a second speech signal (e.g., "start charging") into the neural network model using a neural network model.

The processor 140 may input a second speech signal into the neural network model only if the natural language understanding module does not identify the speech command corresponding to the second speech signal, or may input a second speech signal into the neural network model regardless of whether the natural language understanding module identifies the speech command or not.

The control signal transmitted by the processor 140 to the second external device 200-2 according to one embodiment may be a signal to control the second external device 200-2 to enter the speech recognition mode. In this example, the second external device 200-2 receiving the control signal may output feedback indicating entering of the speech recognition mode (e.g., sound feedback such as "Yes? I'll help you"). It is possible to additionally output feedback (e.g., "please tell me again") requesting the reutterance of the user 1. In another example, the control signal may include the second speech signal or at least one of the text corresponding to the second speech signal. In this example, the second external device 200-2 receiving the control signal may output feedback indicating that it performs the function according to the speech commands contained in the second speech signal (e.g., sound feedback such as "I'll stop cleaning and start charging").

According to an embodiment, after the control signal is transmitted to the second external device 200-2, when the third speech signal (e.g., "start cleaning") is received through the microphone 120, the processor 140 may transmit the third speech signal to the external device 200-2.

Figure 9:
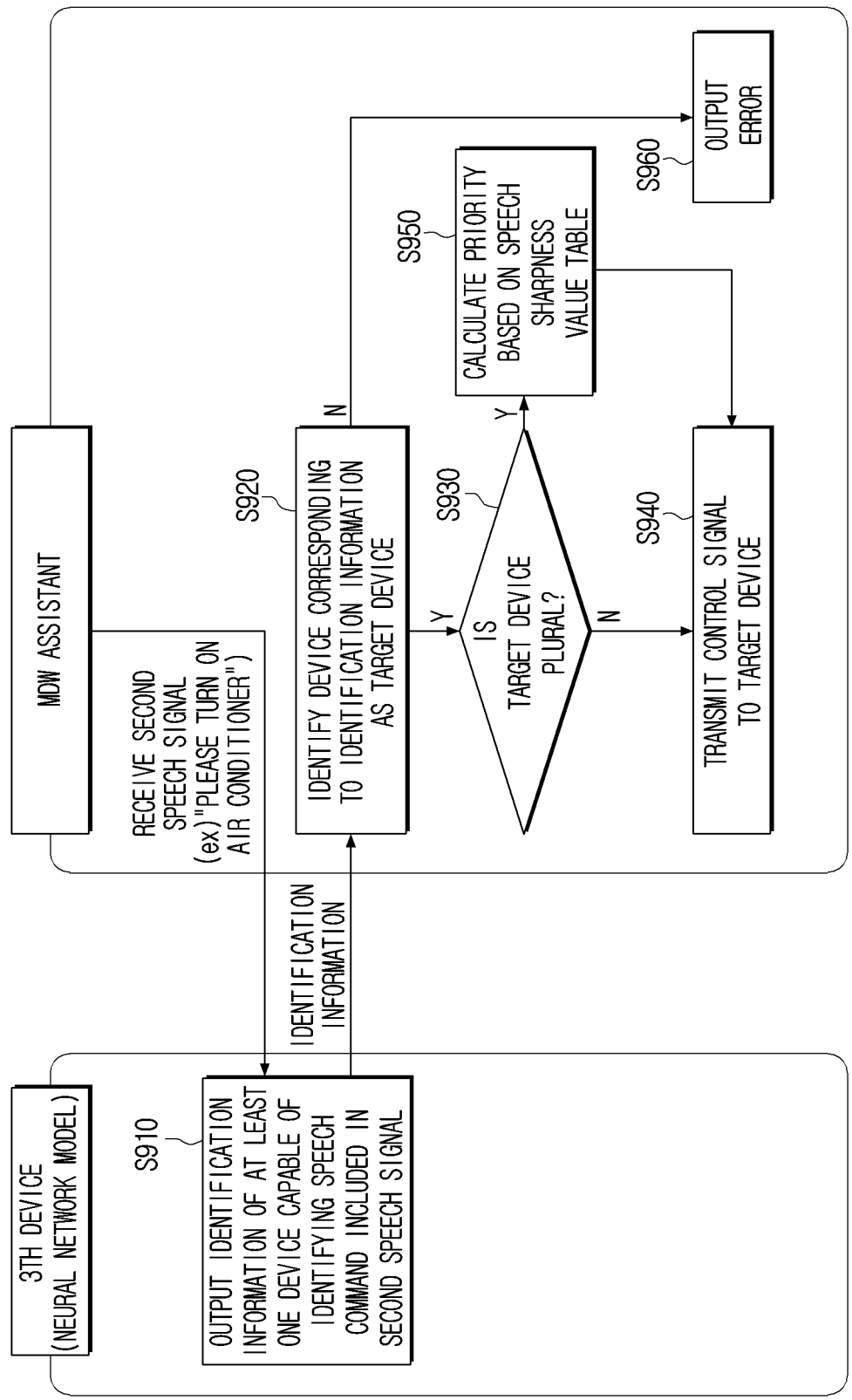
FIG. 9 is a flowchart illustrating a method of using a neural network model by an external device according to an embodiment of the disclosure.

FIG. 9 is a flowchart illustrating a method of using a neural network model by an external device according to an embodiment of the disclosure.

Referring to FIG. 9, the neural network model may be provided in another device instead of the electronic device 100.

For example, when the second speech signal is received, the electronic device 100 may transmit a second speech signal or a text corresponding to the second speech signal to another device. The another device is a predetermined device including a neural network model, and the electronic device 100 may automatically transmit a second speech signal to another device when the second speech signal is received.

A neural network model provided in another device may be the same or different from the neural network model described in FIG. 7.

According to an embodiment, a neural network model provided in another device may be the same as a neural network model provided in the electronic device 100 illustrated in FIG. 7, and may be a model trained to output identification information of at least one device capable of identifying a speech command included in the second speech signal among the plurality of devices in operation S910.

In operation S920, the electronic device 100 may identify whether a device corresponding to the identification information received from another device exists among the plurality of devices, and may identify the device corresponding to the identification information as the target device. In the flowchart shown in FIG. 9, steps S930 to S960 are omitted because it has been described in the flowchart of FIG. 7.

According to another embodiment, a neural network model provided in another device may be different from a neural network model provided in the electronic device 100 described in FIG. 7. The neural network model provided in another device may be a model that identifies a speech command included in a second speech signal received from the electronic device 100 and identifies at least one device capable of performing a function according to the corresponding speech command.

For example, the neural network model may be a model trained to output identification information of each of the plurality of devices, a function performed by each of the plurality of devices, a speech command included in the speech signal with a plurality of speech commands corresponding to each of a plurality of devices as learning data, a function corresponding to the corresponding speech command, and identification information of the device capable of performing the corresponding function.

According to an embodiment, the other device may input a second speech signal into a neural network model to identify a function according to a speech command included in the second speech command and a first external device 200-1 capable of performing the corresponding function.

The electronic device 100 may receive identification information corresponding to the first external device 200-1 and a function according to a speech command included in the second speech command from another device. According to an embodiment, the processor 140 may control the communication interface 130 to transmit a control signal to the first external device 200-1 based on the identification information corresponding to the first external device 200-1. The control signal may be a signal for controlling the first external device 200-1 to perform a function according to a speech command.

According to an embodiment, the neural network model, which is different from the neural network model illustrated in FIG. 7, has been described above, but the embodiment is not limited thereto. The electronic device 100 according to another embodiment may include a neural network model for identifying a speech command included in a second speech signal, and identifying at least one device capable of performing a function and a corresponding function according to a corresponding speech command.

Referring to FIG. 9, the another device may include a specific device (for example, a device of high performance and high source) among a plurality of devices provided in house, an external server, or the like.

Figure 10:
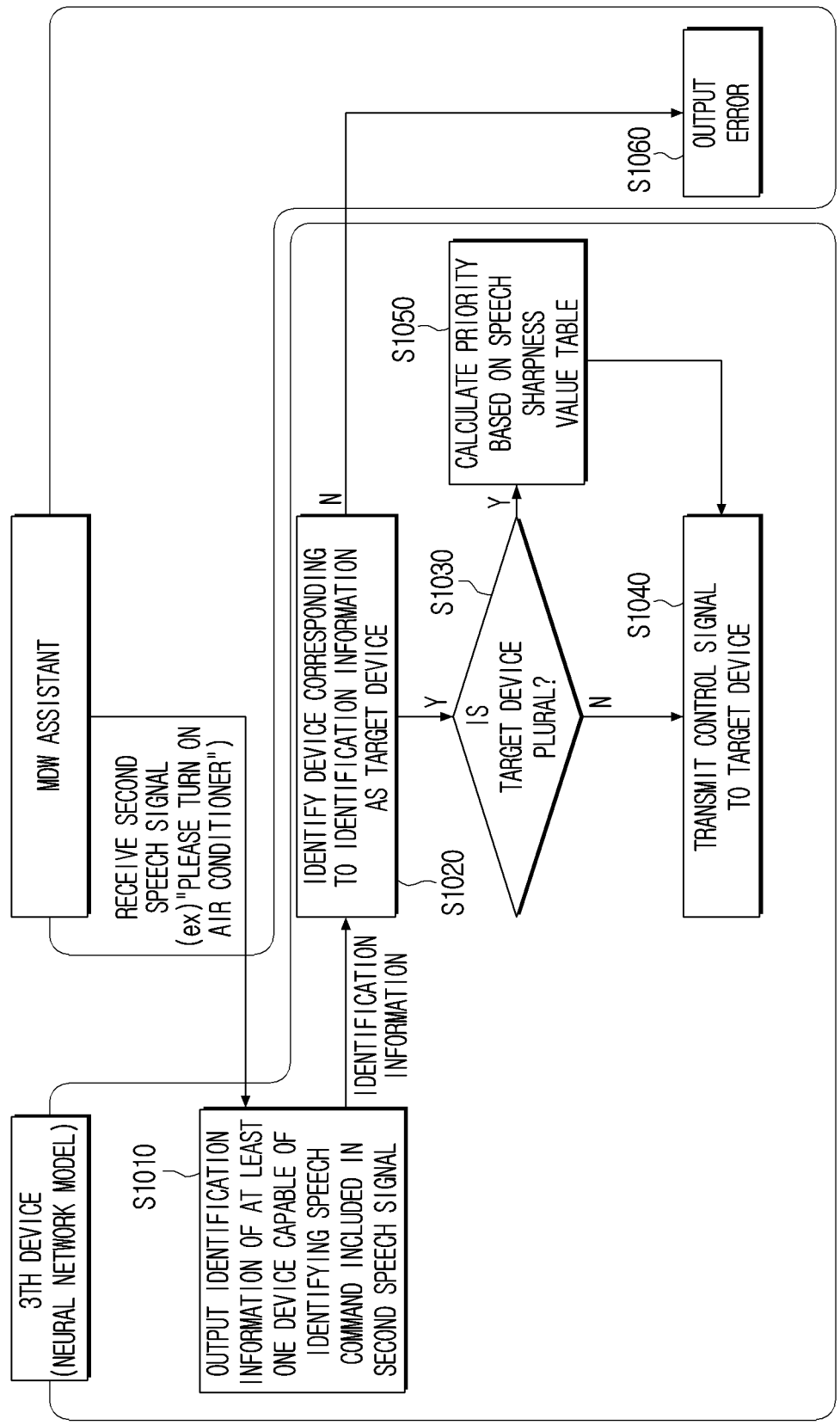
FIG. 10 is a flowchart illustrating a method of using a neural network model by an external device according to another embodiment of the disclosure.

FIG. 10 is a flowchart illustrating a method of using a neural network model by an external device according to another embodiment of the disclosure.

Referring to FIG. 10, when the second speech signal is received, the electronic device 100 may transmit a second speech signal or a text corresponding to the second speech signal to another device. The other device may then perform steps S910 to S950 shown in FIG. 9 (corresponding to steps S1010 to S1050, respectively).

In operation S1060, the other device may control the electronic device 100 to output an error if at least one external device capable of identifying a speech command among the plurality of devices is not identified in operation S1020:N. The electronic device 100 may itself obtain a speech command corresponding to the second speech signal, or may not transmit a control signal to the external device 200, and receive only the result (e.g., whether at least one external device capable of identifying a speech command among the plurality of devices is identified) from another device, and output an error in operation S1060.

Figure 11:
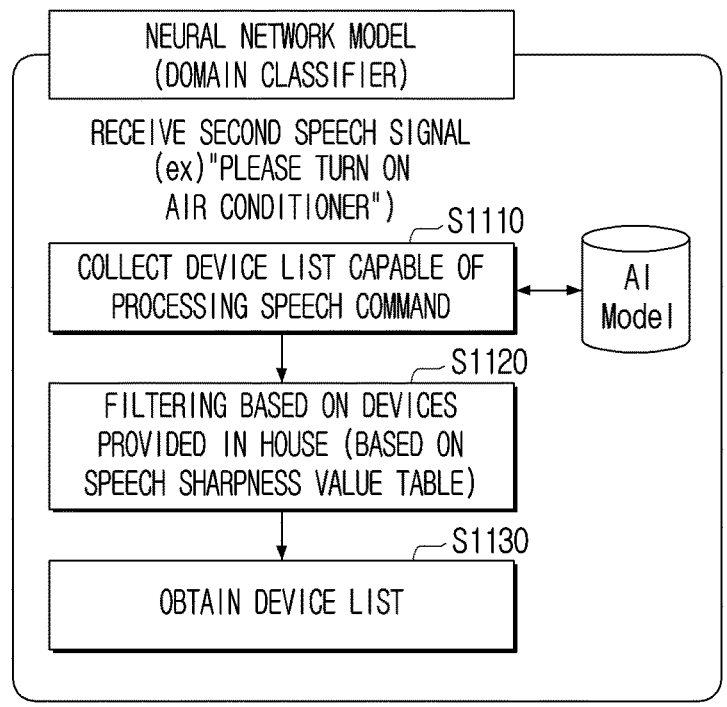
FIG. 11 is a diagram illustrating a neural network model according to an embodiment of the disclosure in detail.
Figure 11:
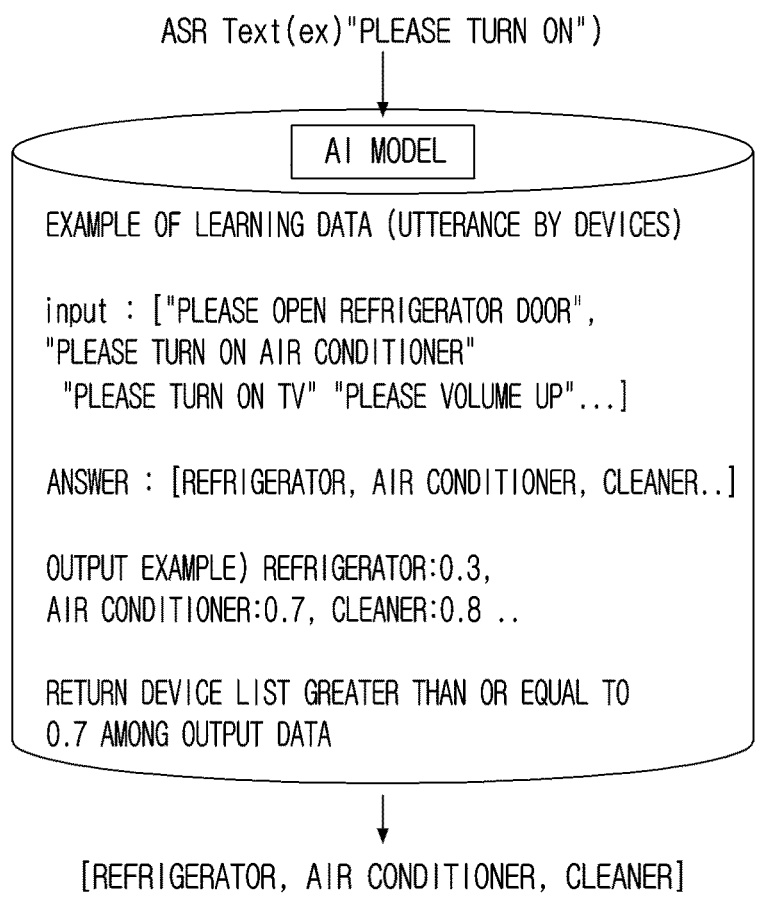

FIG. 11 is a diagram illustrating a neural network model according to an embodiment of the disclosure in detail.

Referring to FIG. 11, processor 140 may first input a second speech signal into a neural network model to obtain a list of a device that may be processed by a speech command or a controllable device list in operation S1110.

In detail, the neural network model may be a model trained to output identification information of each of a plurality of devices (for example, a refrigerator, an air conditioner, a TV, etc.) and by using a plurality of speech commands corresponding to each of the plurality of devices (for example, "please open the refrigerator door", "please turn on air conditioner", "please turn on TV", "please volume up," or the like) as learning data to output identification information of a device identifiable (understandable, or capable of performing a function in accordance with a corresponding speech command) at least one speech command.

The neural network model may analyze the second speech signal (e.g., "please turn on") to output a probability value that predicts whether each of the plurality of devices may identify a speech command included in the second speech signal. As shown in FIG. 11, if the air conditioner, TV, cleaner, etc. have a probability value greater than or equal to a threshold value (e.g., 70%), and the refrigerator, or the like, has a probability value of less than a threshold value, the processor 140 may identify the air conditioner, TV, cleaner or the like, as a list of a device identifiable of a speech command included in the second speech signal or a device that is processible in operation S1110.

The processor 140 may exclude a device that is not included in a house of the plurality of devices included in the device list in operation S1020, determine whether there is a remaining device that is not excluded from the device list, or whether the remaining device is a plurality of devices (identifying the target device) in operation S710 of FIG. 7, operation S720 (identifying whether the target device is plural or not), and obtaining a device list capable of identifying a speech command corresponding to the second speech signal.

Figure 12:
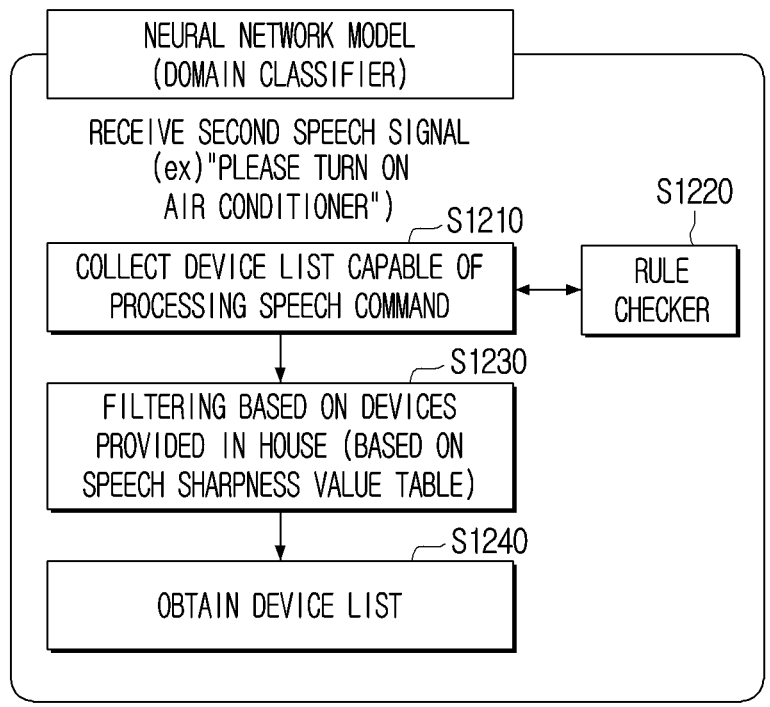
FIG. 12 is a diagram illustrating a rule-based electronic device according to another embodiment of the disclosure.
Figure 12:
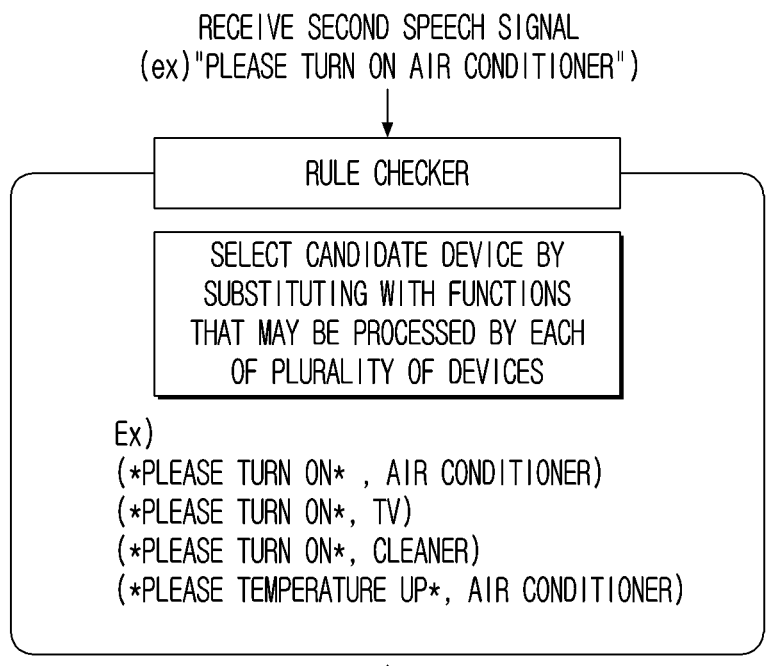

FIG. 12 is a diagram illustrating a rule-based electronic device according to another embodiment of the disclosure.

Referring to FIG. 12, the processor 140 may first input a second speech signal to a rule-based checking module (e.g., a rule checker) to obtain a processible device list, or a controllable device list by speech command in operation S1210 and S1220.

The rule-based checking module may include a database (DB) obtained by collecting (or integrating) a plurality of speech commands (for example, "please open the refrigerator door", "please turn on air conditioner", "please turn on TV", "please volume up," or the like) corresponding to each of the plurality of devices and identification information of a plurality of devices (e.g., refrigerator, air conditioner, TV, or the like).

The rule-based checking module may compare the text corresponding to the second speech signal (e.g., "please turn on") with the DB to output a speech command having a similarity equal to or greater than a threshold value with a second speech signal among the speech commands of each of the plurality of devices, and at least one device corresponding to the speech command.

The processor 140 may check whether the air conditioner, the TV, the cleaner, etc. output by the rule-based checking module is a device provided in the house and filters the same S1230, and may obtain a speech command included in the second speech signal as an identifiable or processible device list in operation S1240.

Returning to FIG. 2, the electronic device 100 according to various embodiments may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a medical device, a camera, a virtual reality (VR) device, or a wearable device. A wearable device may include at least one of an accessory type (e.g., a watch, a ring, a bracelet, an ankle bracelet, a necklace, a pair of glasses, a contact lens or a head-mounted-device (HMD)); a fabric or a garment-embedded type (e.g.: electronic cloth); skin-attached type (e.g., a skin pad or a tattoo); or a bio-implantable circuit.

In some embodiments, the electronic device 100 may include at least one of, for example, a television, a digital video disk (DVD) player, an audio system, a refrigerator, air-conditioner, a cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™), an electronic dictionary, an electronic key, a camcorder, or an electronic frame.

In other embodiments, the electronic device 100 may include at least one of a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), computed tomography (CT), or ultrasonic wave device, etc.), a navigation system, a global navigation satellite system (GNSS), an event data recorder (EDR), a flight data recorder (FDR), an automotive infotainment devices, a marine electronic equipment (e.g., marine navigation devices, gyro compasses, etc.), avionics, a security device, a car head unit, industrial or domestic robots, a drone, an automated teller machine (ATM), a point of sale (POS) of a store, or an Internet of Things (IoT) device (e.g., light bulbs, sensors, sprinkler devices, fire alarms, thermostats, street lights, toasters, exercise equipment, hot water tanks, heater, boiler, etc.).

That the AI model is trained may refer, for example, to a basic AI model (for example, an AI model including any random parameter) being trained using a plurality of training data by a learning algorithm, so that a predefined action rule or AI model set to perform a desired property (or purpose) is made. The learning may be accomplished through a separate server and/or system, but is not limited thereto and may be implemented in the electronic device 100. Examples of learning algorithms include, but are not limited to, supervised learning, unsupervised learning, semi-supervised learning, or reinforcement learning.

Each of the AI models may be implemented, for example, and without limitation, as convolutional neural network (CNN), recurrent neural network (RNN), restricted Boltzmann machine (RBM), deep belief network (DBN), bidirectional recurrent deep neural network (BRDNN), deep Q-networks, or the like, but is not limited thereto.

The processor 140 for executing the AI model according to an example embodiment may be a general-purpose processor such as a central processor (CPU), an application processor (AP), a digital signal processor (DSP), a dedicated processor, or the like, a graphics-only processor such as a graphics processor (GPU), a vision processing unit (VPU), an AI-only processor such as a neural network processor (NPU), or the like, but is not limited thereto. The processor 140 may perform control to process the input data according to a predefined operating rule or AI model stored in the memory 110. If the processor 140 is an AI-only processor, it may be designed with a hardware structure specialized for the processing of a particular AI model. For example, hardware specific to the processing of a particular AI model may be designed into a hardware chip, such as an application specific integrated circuit (ASIC), a field programmable gate array (FPGA), or the like. When the processor 140 is implemented as a dedicated processor, the processor 140 may be implemented to include a memory for implementing the embodiments of the disclosure, or may be implemented to include a memory processing function for using an external memory.

According to another example, the memory 110 may store information about an AI model that includes a plurality of layers. Storing information about the AI model may refer, for example, to storing various information related to the operation of the AI model, for example, information about a plurality of layers included in the AI model, information about parameters (for example, filter coefficients, bias, etc.) used in each of the plurality of layers, and the like.

The memory 110 may store data necessary for various embodiments of the disclosure. The memory 110 may be implemented as a memory embedded in the electronic device 100, or may be implemented as a detachable memory in the electronic device 100, according to the data usage purpose.

For example, data for driving the electronic device 100 may be stored in a memory embedded in the electronic device 100, and data for an additional function of the electronic device 100 may be stored in the memory detachable to the electronic device 100. A memory embedded in the electronic device 100 may be a volatile memory such as a dynamic random access memory (DRAM), a static random access memory (SRAM), a synchronous dynamic random access memory (SDRAM), or a nonvolatile memory. (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD), or the like. In the case of a memory detachably mounted to the electronic device 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a USB memory) connectable to the USB port, or the like.

According to an embodiment, the memory 110 may store a computer program including at least one instruction or instructions for controlling the electronic device 100.

According to another example, the memory 110 may store information about an AI model that includes a plurality of layers. Storing information about the AI model may refer, for example, to storing various information related to the operation of the AI model, for example, information about a plurality of layers included in the AI model, information about parameters (for example, filter coefficients, bias, etc.) used in each of the plurality of layers, and the like. For example, the memory 110 may store a neural network model according to an embodiment.

The electronic device 100 according to an embodiment may include a display (not shown) and the display (not shown) may display various screens. The display may be implemented as a display including a self-emitting element or a display including a non-self-limiting element and a backlight. For example, the display may be implemented as a display of various types such as, for example, and without limitation, a liquid crystal display (LCD), organic light emitting diodes (OLED) display, light emitting diodes (LED), micro LED, mini LED, plasma display panel (PDP), quantum dot (QD) display, quantum dot light-emitting diodes (QLED), or the like. In the display 150, a backlight unit, a driving circuit which may be implemented as an a-si TFT, low temperature poly silicon (LTPS) TFT, organic TFT (OTFT), or the like, may be included as well. The display 150 may be implemented as a touch screen coupled to a touch sensor, a flexible display, a rollable display, a third-dimensional (3D) display, a display in which a plurality of display modules are physically connected, or the like.

The display according to an embodiment may display various visual feedbacks (e.g., error) according to the control of the processor 140.

Figure 13:
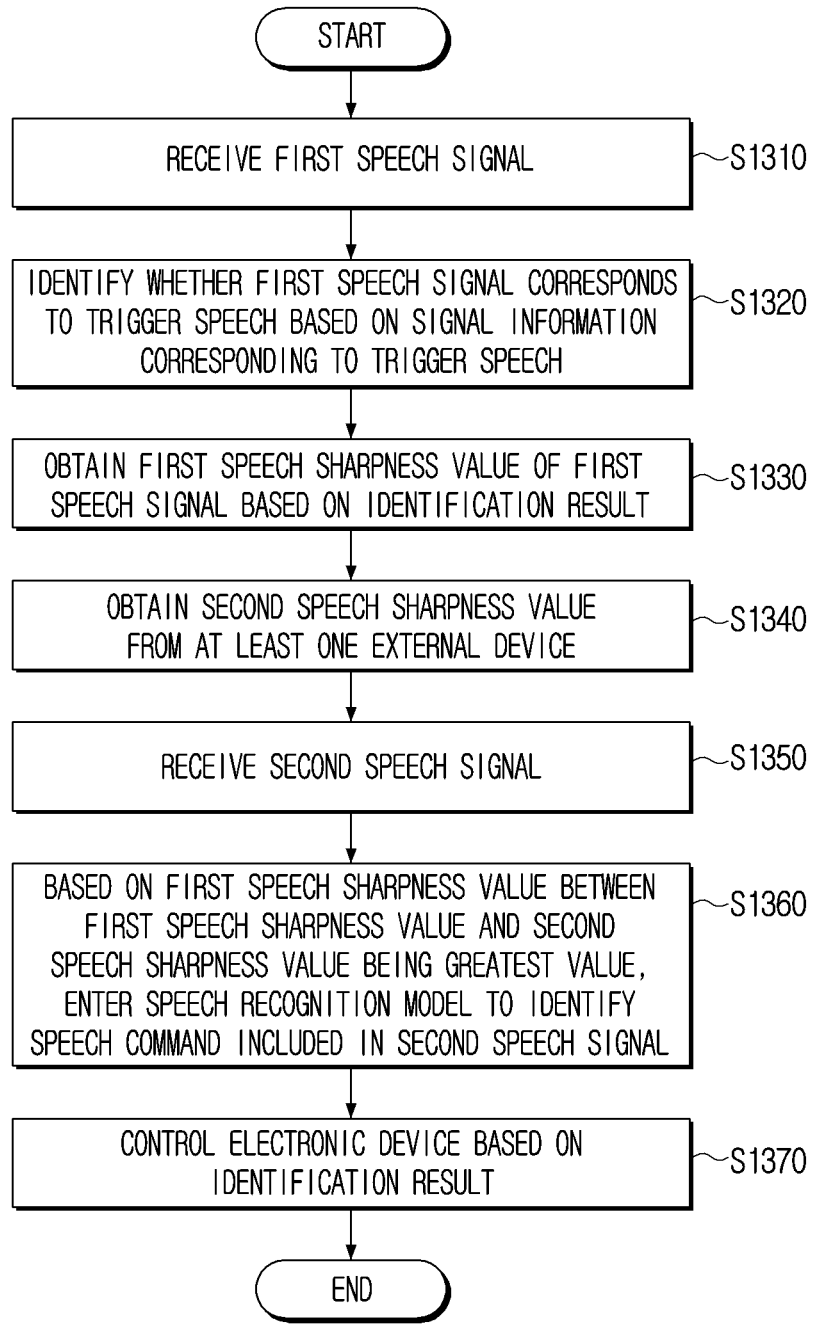
FIG. 13 is a flowchart illustrating a method of controlling an electronic device according to an embodiment of the disclosure.

FIG. 13 is a flowchart illustrating a method of controlling an electronic device according to an embodiment of the disclosure.

A method of controlling an electronic device includes receiving a first speech signal, identifying whether the first speech signal corresponds to the trigger speech based on signal information corresponding to the trigger speech and obtaining a first speech sharpness value of the first speech signal based on the identification result in operation S1310, S1320 and S1330.

The method may include obtaining a second speech sharpness value from the at least one external device in operation S1340.

The method may include receiving a second speech signal, and based on the first speech sharpness value being the greatest between the first speech sharpness value and the second speech sharpness value, identifying a speech command included in the second speech signal by entering a speech recognition mode in operation S1350 and S1360.

The method may include controlling the electronic device based on an identification result in operation S1370. The controlling the electronic device in operation S1370 may include, based on the speech command not being identified, transmitting a control signal to the at least one external device based on the second speech sharpness value.

The obtaining the second sharpness value in operation S1340 may include obtaining a second speech sharpness value corresponding to each of a plurality of external devices, the controlling the electronic device in operation S1370 may include, based on the speech command not being identified, transmitting the control signal to an external device corresponding to a greatest value among the plurality of second speech sharpness values, the control signal may include at least one of a signal to control the external device to enter a speech recognition mode, the second speech signal, or a text corresponding to the second speech signal.

The controlling the electronic device in operation S1370 may include, based on a signal indicating that the external device receiving the control signal fails to identify a speech command included in the second speech signal, sequentially transmitting the control signal to a remaining external device based on the plurality of second speech sharpness values.

The controlling the electronic device in operation S1370 according to an embodiment may include, based on the speech command not being identified, identifying a first external device capable of identifying the speech command among the at least one external device by inputting the second speech signal to the first neural network model; and transmitting the control signal to the identified first external device.

The controlling the electronic device in operation S1370 may include, based on a plurality of external devices capable of identifying the speech command being identified among the at least one external device, transmitting the control signal to the first external device corresponding to a greatest value among the second speech sharpness values corresponding to each of the plurality of identified external devices; and based on an external device capable of identifying the speech command not being identified among the at least one external device, outputting feedback information indicative of error occurrence.

The controlling the electronic device in S1370 according to an embodiment may include, based on the speech command not being identified, identifying a function corresponding to a speech command included in the second speech signal and a first external device capable of performing the function by inputting the second speech signal to the second neural network model, and transmitting the control signal to the identified first external device, and the control signal according to an embodiment may be a signal to control the first external device to perform a function corresponding to the speech command.

The method according to an embodiment may further include, based on receiving a third speech signal through the microphone after the control signal is transmitted to the at least one external device, transmitting at least one of the third speech signal or a text corresponding to the third speech signal to the external device.

The method according to an embodiment may further include transmitting the first speech sharpness value to the external device, and the identifying the speech command in operation S1340 may include, based on the first speech sharpness value between the first speech sharpness value and the second speech sharpness value not being the greatest value, not entering the speech recognition mode.

The method according to an embodiment may further include, based on receiving a control signal from the at least one external device through the communication interface, entering the speech recognition mode or performing a function corresponding to a speech signal included in the control signal based on the control signal.

The method according to an embodiment, wherein the trigger speech corresponding to the electronic device and the trigger speech corresponding to the at least one external device may be identical.

The various embodiments may be applicable to not only electronic device but also all types of electronic devices capable of receiving an audio signal.

The various example embodiments described above may be implemented in a recordable medium which is readable by computer or a device similar to computer using software, hardware, or the combination of software and hardware. In some cases, embodiments described herein may be implemented by the processor itself. According to a software implementation, embodiments such as the procedures and functions described herein may be implemented with separate software modules. Each of the above-described software modules may perform one or more of the functions and operations described herein.

The computer instructions for performing the processing operations of the electronic device 100 according to the various embodiments described above may be stored in a non-transitory computer-readable medium. The computer instructions stored in this non-transitory computer-readable medium cause the above-described specific device to perform the processing operations of the electronic device 100 according to the above-described various embodiments when executed by the processor of the specific device.

The non-transitory computer readable medium may refer, for example, to a medium that stores data, such as a register, a cache, a memory or etc., and is readable by a device. For example, the aforementioned various applications, instructions, or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

While the disclosure has been shown and described with reference to various embodiments thereof, it will be understood by those of skilled in the art that various changes in form and details may be made therein without departing from the spirit and scope of the disclosure as defined by the appended claims and their equivalents.

What is claimed is:

1. An electronic device comprising:
    a memory to store signal information corresponding to a trigger speech;
    a microphone;
    a communication interface; and
    a processor configured to:
        identify whether a first speech signal received through the microphone corresponds to the trigger speech based on the signal information,
        obtain a first speech sharpness value of the first speech signal based on the first speech signal being identified as corresponding to the trigger speech,
        obtain a second speech sharpness value from at least one external device through the communication interface,
        based on the first speech sharpness value being greater than the second speech sharpness value, identify a speech command included in a second speech signal received through the microphone by entering a speech recognition mode, and
        control the electronic device based on the speech command identified from the second speech signal,
        wherein the processor is further configured to, based on the speech command being unidentified from the second speech signal, control the communication interface to transmit a control signal to the at least one external device based on the second speech sharpness value,
        wherein the control signal comprises at least one of a signal to cause the at least one external device to enter a speech recognition mode.

2. The electronic device of claim 1, wherein the processor is further configured to:
    obtain a second speech sharpness value corresponding to each of a plurality of external devices including the at least one external device through the communication interface,
    based on the speech command being unidentified from the second speech signal, control the communication interface to transmit the control signal to an external device corresponding to a greatest value among a plurality of second speech sharpness values, and
    wherein the control signal comprises at least one of a signal the second speech signal, or a text corresponding to the second speech signal.

3. The electronic device of claim 2, wherein the processor is further configured to, based on a signal indicating that the external device receiving the control signal fails to identify the speech command included in the second speech signal through the communication interface, sequentially transmit the control signal to a remaining external device among the plurality of external devices based on the plurality of second speech sharpness values.

4. The electronic device of claim 1, wherein the memory is configured to store identification information corresponding to the at least one external device and a first neural network model,
    wherein the processor is further configured to:
        based on the speech command being unidentified from the second speech signal, identify a first external device enabled to identify the speech command among the at least one external device by inputting the second speech signal to the first neural network model, and
        control the communication interface to transmit the control signal to the identified first external device.

5. The electronic device of claim 4, wherein the processor is further configured to:
    based on a plurality of external devices being enabled to identify the speech command among the at least one external device, transmit the control signal to the first external device corresponding to a greatest value among a plurality of second speech sharpness values corresponding to each of the plurality of identified external devices, and
    based on an external device, among the plurality of external devices, being enabled to identify the speech command unidentified, output feedback information indicative of error occurrence.

6. The electronic device of claim 1, wherein the memory is configured to store identification information corresponding to the at least one external device and a second neural network model,
    wherein the processor is further configured to:
        based on the speech command being unidentified from the second speech signal, identify a function corresponding to a speech command included in the second speech signal and a first external device enabled to perform the function by inputting the second speech signal to the second neural network model,
        control the communication interface to transmit the control signal to the identified first external device, and
        wherein the control signal is a signal to control the first external device to perform a function corresponding to the speech command.

7. The electronic device of claim 1, wherein the processor is further configured to, based on receiving a third speech signal through the microphone after the control signal is transmitted to the at least one external device, transmit at least one of the third speech signal or a text corresponding to the third speech signal to the at least one external device.

8. The electronic device of claim 1, wherein the processor is further configured to:
    control the communication interface to transmit the first speech sharpness value to the at least one external device, and
    wherein the electronic device does not enter the speech recognition mode based on the first speech sharpness value being less than the second speech sharpness value.

9. The electronic device of claim 8, wherein the processor is further configured to, based on receiving a control signal from the at least one external device through the communication interface, enter the speech recognition mode or perform a function corresponding to a speech signal included in the control signal based on the control signal.

10. The electronic device of claim 1, wherein the trigger speech corresponding to the electronic device and the trigger speech corresponding to the at least one external device are identical.

11. A method of controlling an electronic device, the method comprising:
    receiving a first speech signal;
    identifying whether the first speech signal corresponds to a trigger speech based on signal information corresponding to the trigger speech;
    obtaining a first speech sharpness value of the first speech signal based on the first speech signal being identified as corresponding to the trigger speech;

obtaining a second speech sharpness value from at least one external device;

receiving a second speech signal;

based on the first speech sharpness value being greater than the second speech sharpness value, identifying a speech command included in the second speech signal by entering a speech recognition mode; and controlling the electronic device based on the speech command identified from the second speech signal, wherein the controlling the electronic device comprises, based on the speech command being unidentified from the second speech signal, transmitting a control signal to the at least one external device based on the second speech sharpness value, wherein the control signal comprises at least one of a signal to cause the at least one external device to enter a speech recognition mode.

12. The method of claim 11, wherein the obtaining the second sharpness value comprises obtaining a second speech sharpness value corresponding to each of a plurality of external devices including the at least one external device, wherein the controlling the electronic device comprises, based on the speech command being unidentified from the second speech signal, transmitting the control signal to an external device corresponding to a greatest value among a plurality of second speech sharpness values, wherein the control signal comprises at least one of the second speech signal, or a text corresponding to the second speech signal.

13. The method of claim 12, wherein the controlling the electronic device comprises, based on a signal indicating that the external device receiving the control signal fails to identify the speech command included in the second speech signal, sequentially transmitting the control signal to a remaining external device among the plurality of external devices based on the plurality of second speech sharpness values.

14. The method of claim 11, wherein the controlling the electronic device comprises:

based on the speech command being unidentified from the second speech signal, identifying a first external device being enabled to identify the speech command among the at least one external device by inputting the second speech signal to a first neural network model; and transmitting the control signal to the identified first external device.

15. The method of claim 14, wherein the controlling the electronic device comprises:

based on a plurality of external devices being enabled to identify the speech command among the at least one external device, transmitting the control signal to the first external device corresponding to a greatest value among a plurality of second speech sharpness values corresponding to each of the plurality of identified external devices; and based on an external being enabled to identify the speech command being unidentified among the at least one external device, outputting feedback information indicative of error occurrence.

16. The method of claim 11, wherein the controlling the electronic device comprises:

based on the speech command being unidentified from the second speech signal, identifying a function corresponding to a speech command included in the second speech signal and a first external device enabled to perform the function by inputting the second speech signal to a second neural network model; and transmitting the control signal to the identified first external device, and wherein the control signal is a signal to control the first external device to perform a function corresponding to the speech command.

17. The method of claim 11, wherein the method further comprises, based on receiving a third speech signal through a microphone after the control signal is transmitted to the at least one external device, transmitting at least one of the third speech signal or a text corresponding to the third speech signal to the external device.

18. The method of claim 11, wherein the method further comprises transmitting the first speech sharpness value to the external device, and wherein the electronic device does not enter the speech recognition mode based on the first speech sharpness value being less than the second speech sharpness value.

19. The method of claim 18, wherein the method further comprises, based on receiving a control signal from the at least one external device through a communication interface, entering the speech recognition mode or perform a function corresponding to a speech signal included in the control signal based on the control signal.

20. The method of claim 11, wherein the trigger speech corresponding to the electronic device and the trigger speech corresponding to the at least one external device are identical.

* * * * *